United States Patent [19]

Monroe et al.

[11] Patent Number: 5,671,091
[45] Date of Patent: Sep. 23, 1997

[54] VIRTUAL EASEL

[75] Inventors: Marshall M. Monroe, Glendale; Eric C. Haseltine, Manhattan; William G. Adamson, Pacoima, all of Calif.

[73] Assignee: The Walt Disney Company, Burbank, Calif.

[21] Appl. No.: 228,603

[22] Filed: Apr. 15, 1994

[51] Int. Cl.$^6$ .................... G02B 27/14; G09B 11/00; A47B 97/00; A47B 97/04

[52] U.S. Cl. .................... 359/635; 359/637; 359/630; 434/85; 434/88; 248/441.1; 108/6; 108/7; 108/9; 108/10; 312/223.3

[58] Field of Search .................... 359/635, 630, 359/637, 629, 449; 434/85, 88; 248/441.1, 447, 458; 108/6, 7, 9, 10, 50; 312/10.1, 223.3; 364/188

[56] References Cited

U.S. PATENT DOCUMENTS

| | | | |
|---|---|---|---|
| 561,797 | 6/1896 | Langworthy | 434/88 |
| 1,111,608 | 9/1914 | O'Brien | 434/88 |
| 1,420,491 | 6/1922 | Morse | 359/635 |
| 1,479,691 | 1/1924 | Anstock | 359/635 |
| 1,518,680 | 12/1924 | Arnot | 434/85 |
| 2,079,508 | 5/1937 | Kaplowitz | 434/88 |
| 2,083,472 | 6/1937 | Reed | 434/85 |
| 2,387,021 | 10/1945 | Hendershot | 359/635 |
| 2,673,492 | 3/1954 | Reswick | 359/635 |
| 4,098,009 | 7/1978 | Flynn | 434/88 |
| 4,428,631 | 1/1984 | Cope et al. | 108/6 |
| 5,450,800 | 9/1995 | Leonard | 108/7 |

OTHER PUBLICATIONS

Lippman, Andrew, "And Seeing Through Your Hand," Proceedings of the SID, vol. 22/2, 1981 pp. 103–107.

Schmandt, Christopher, "Interactive three-dimensional computer space," SPIE, vol. 367 Processing and Display of Three-Dimensional Data (1982), pp. 155–159.

*Primary Examiner*—Scott A. Rogers
*Attorney, Agent, or Firm*—Fish & Neave; Laurence S. Rogers; Robert W. Morris

[57] ABSTRACT

An improved computer graphic work station is disclosed of the type that includes a digitizer for allowing an artist or other user to input a drawing into a computer, and an imaging device to produce an image of the drawing as it is being drawn. A beam splitter reflects at least a portion of the produced image to the eye of the user. The position and orientation of the beam splitter may be varied by a user relative to the imaging device in order to allow the user to align the workstation by causing the reflected image to appear, in the user's eye, to be substantially coincident with the drawing. Once aligned, the user may adjust the position and orientation of the digitizing surface without upsetting the alignment.

174 Claims, 13 Drawing Sheets

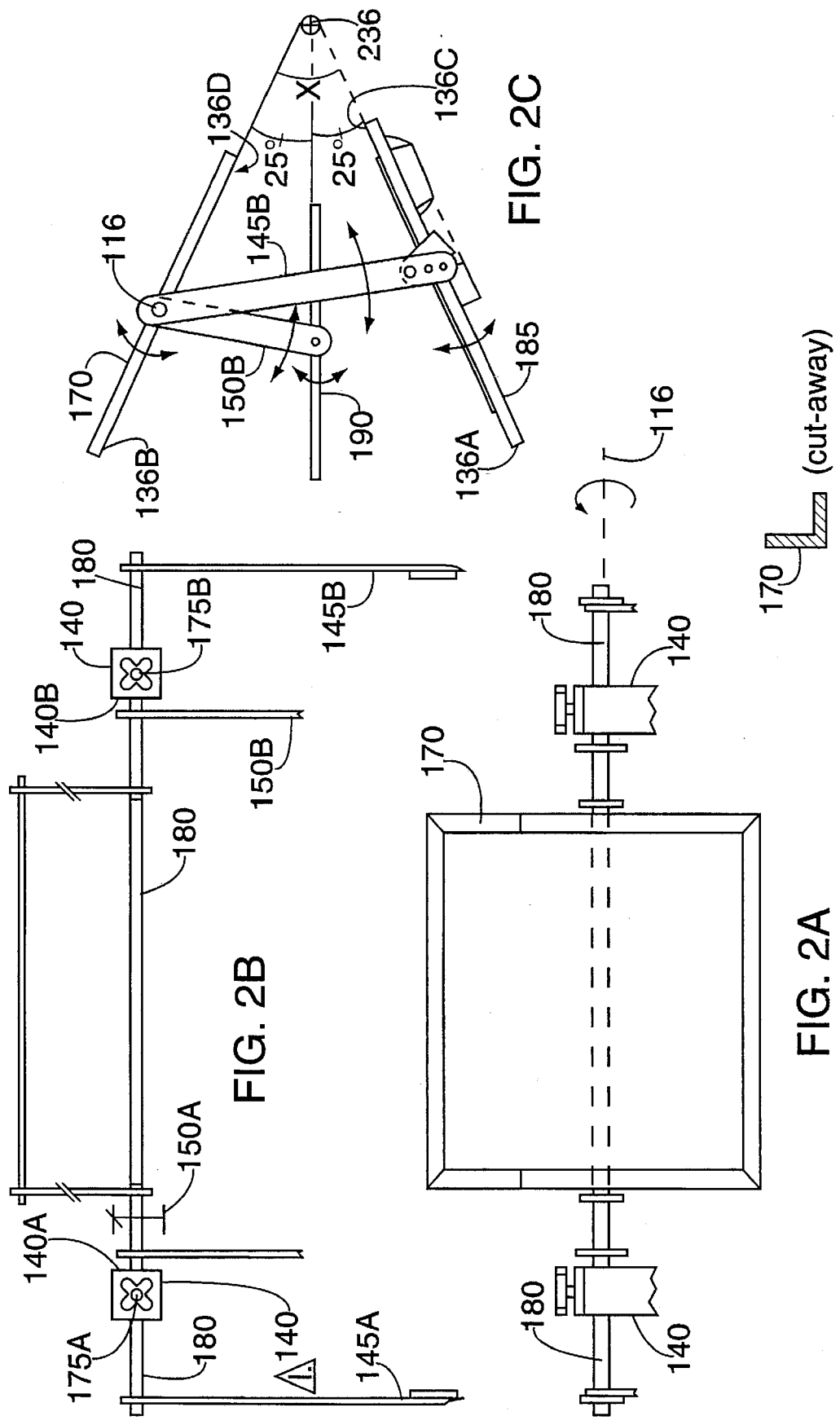

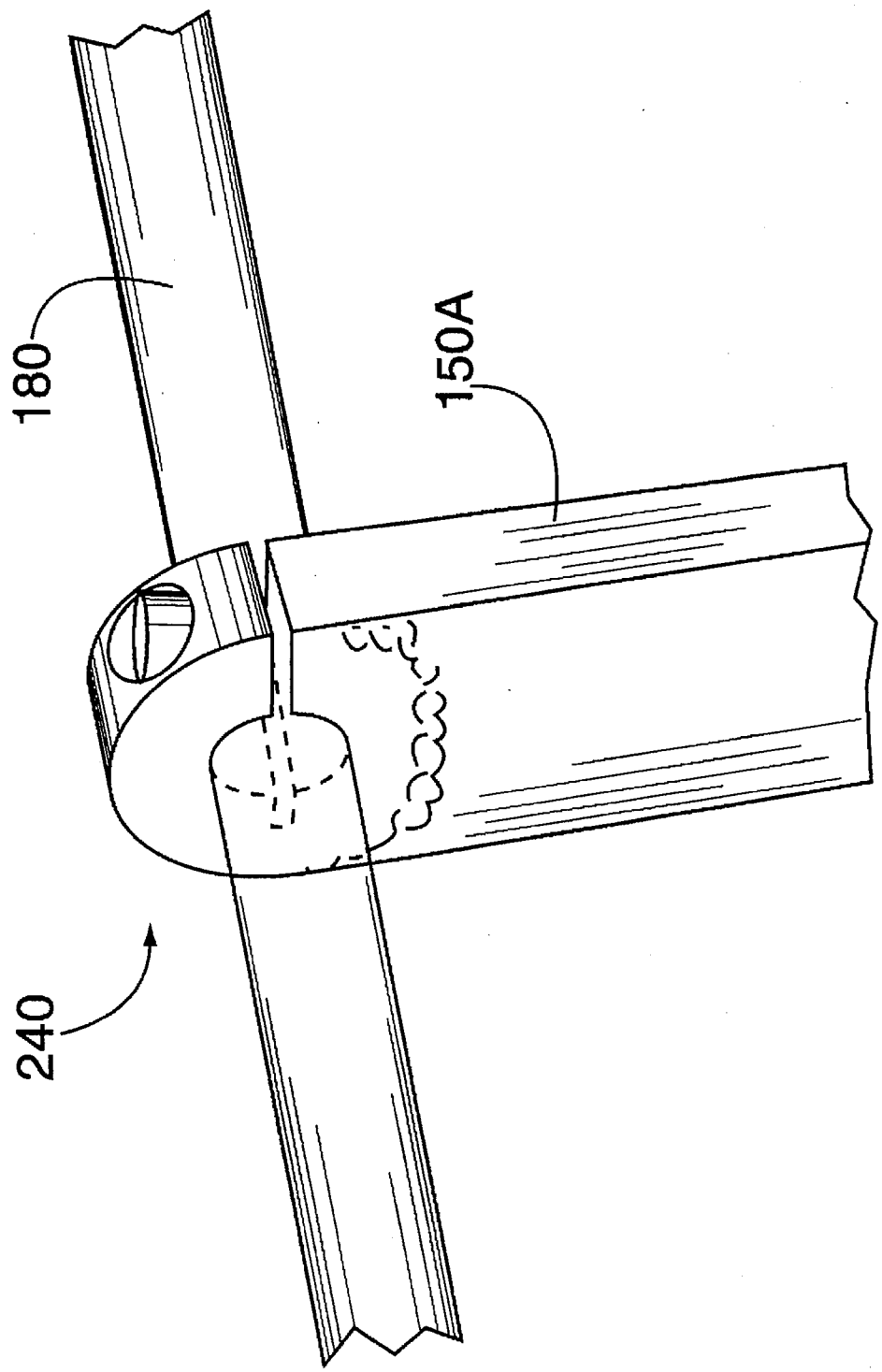

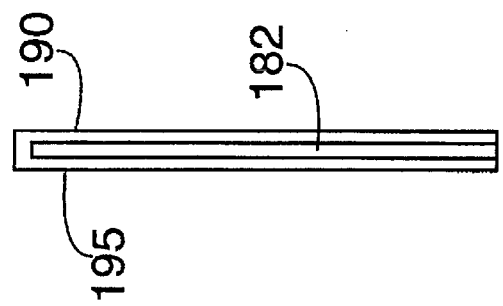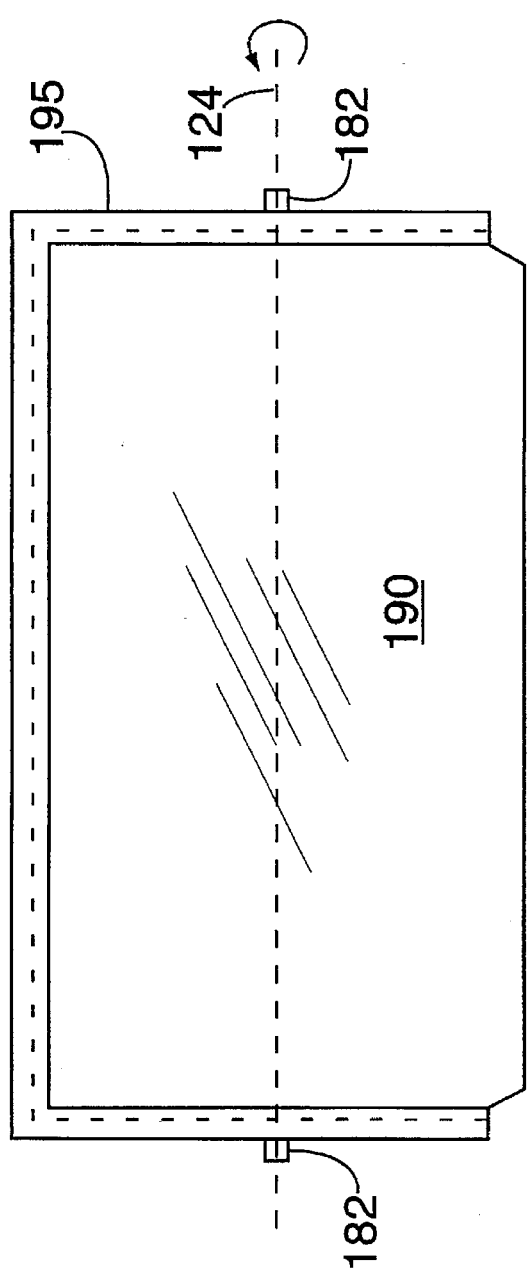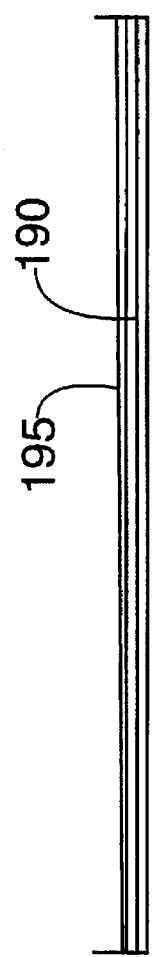

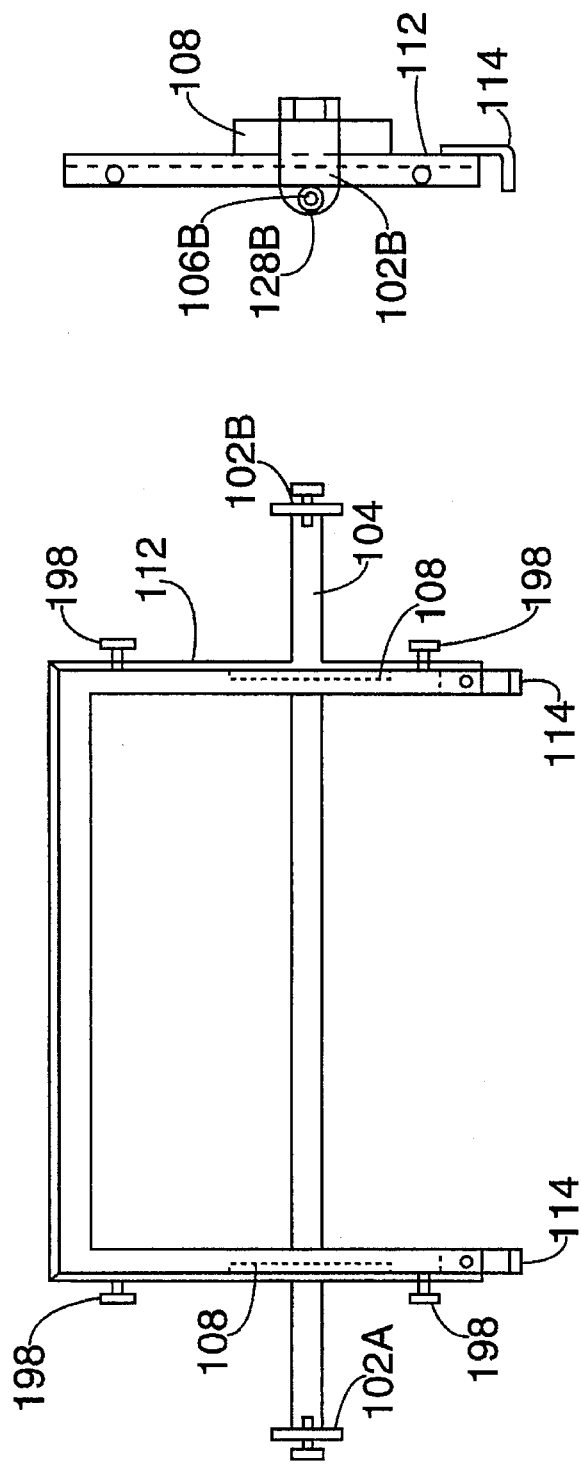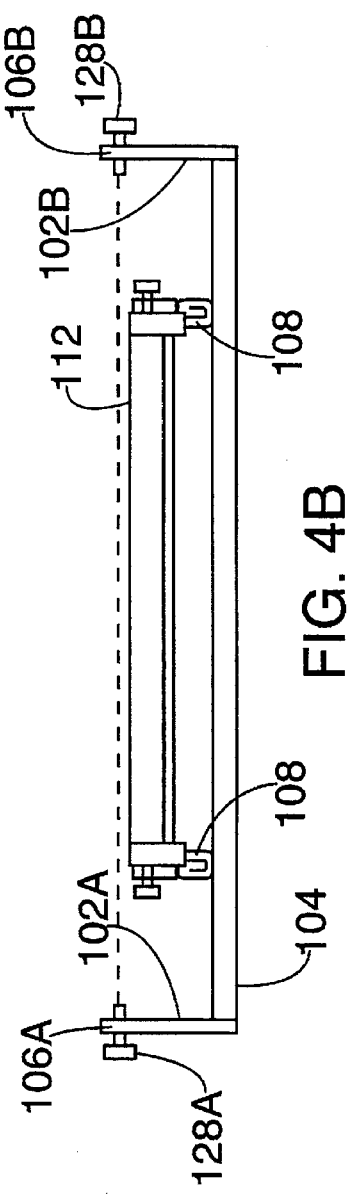

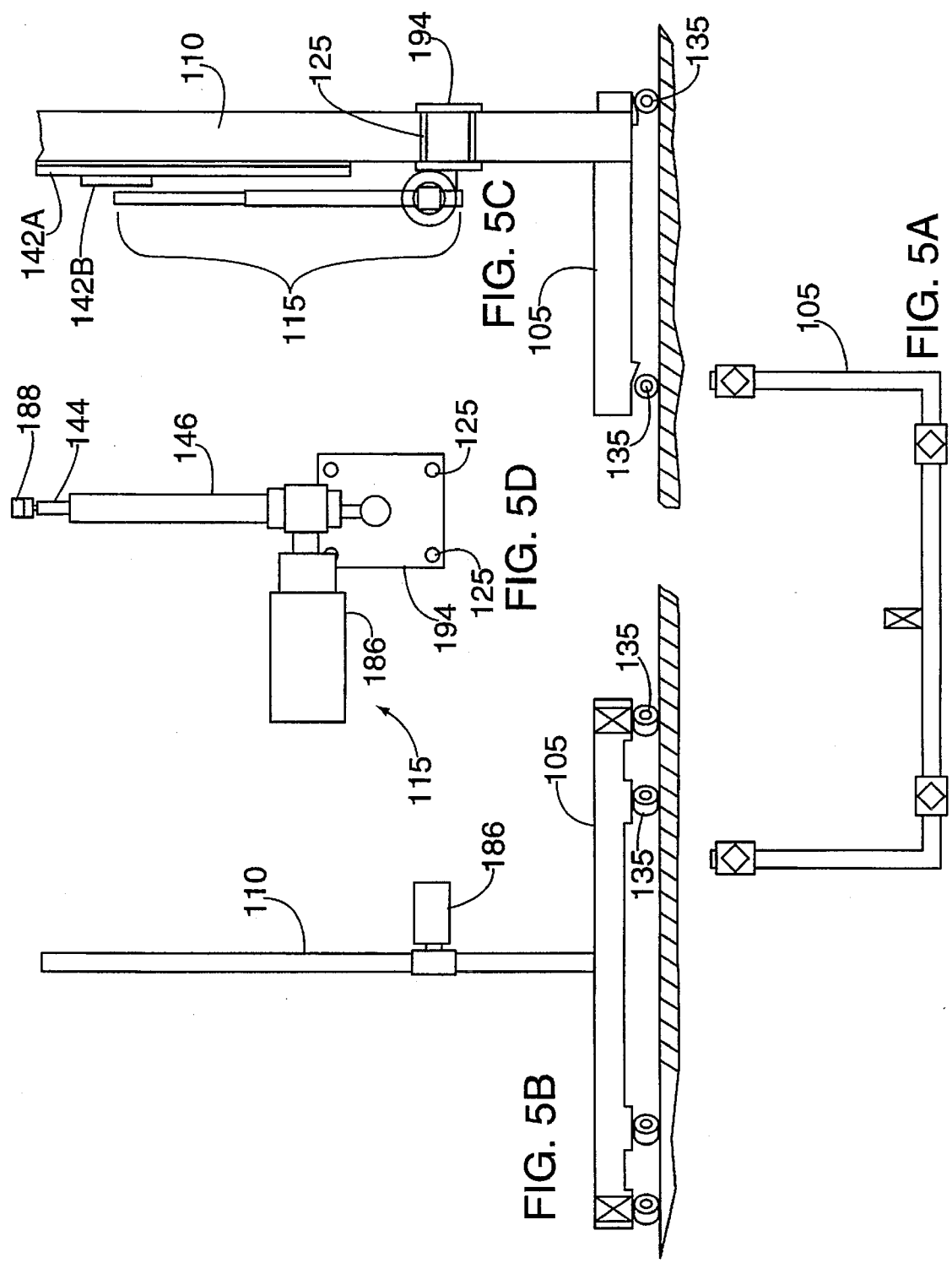

VIRTUAL EASEL

This invention relates to an improved drawing device for a computer graphic workstation that allows an artist or other user to enter a drawing into a computer using a digitizing tablet, while observing the image being drawn superimposed on the tablet.

BACKGROUND OF THE INVENTION

The direct input of drawn images into a computer has been long known in the art. Digitizing tablets (including pen-based input systems) are now commonly used devices for allowing an artist, calligrapher or other user to draw or write directly into a computer system. Drawings are made by passing a drawing stylus (such as a light pen, a magnetic pen, metal pointer or other appropriately coupled drawing instrument) over the tablet's digitizing surface. The traces made by the user with the drawing instrument are digitized by the tablet into a stream of positional and, in some cases, pressure data that are input into the computer. The computer, running a suitable graphics program, translates these data to cause traces corresponding to the movement of the instrument to be displayed on a CRT monitor or other output device. In some cases, the data are used by handwriting recognition software running on the computer. Depending on the mode of operation and drawing "tools" selected by the user through the software controlling the computer, thin lines, thick lines, brush strokes or even spray painting effects can be drawn into the computer in this manner.

One problem with conventional drawing systems utilizing digitizing tablets, however, is that the image being drawn is displayed relatively far from where the drawing is actually occurring. This is because typical digitizing tablets are simply input devices. The drawing being made is displayed elsewhere, requiring the artist to look away from his or her hand—and the drawing instrument—to see what is being drawn. Artists who are used to drawing on paper find this to be distracting, unnatural and tiring.

Various ways have been devised in an attempt to solve this problem. For example, it is known in the art to use a CRT with a clear or translucent digitizing membrane or tablet registered over its surface to enable an artist to draw directly on top of the image being displayed. While this solves the problem of having to look away from where the drawing is being made to see the image being drawn, the glass of the CRT causes the drawing actually to be imaged ¼- to ⅜-inch behind the drawing surface. This separation between input and output creates another problem—the drawing instrument, and the image are closely, but not exactly, coincident with one another. This creates a parallax effect. Because of the closeness of the work, and the sensitivity of the human eye to parallax at this distance, the inexact alignment of image and drawing instrument is generally considered unsatisfactory by artists who desire the tip of their drawing instrument to be "touching the ink" as it flows onto paper.

Other unsatisfactory ways that have been tried to register input and output include placing a transparent tablet in front of a display screen or surface, and projecting images onto the back surface of a transparent tablet. Liquid crystal and active matrix display devices have also been used in an attempt to avoid the parallax problem. Parallax, however, is still a problem with each of these approaches because a sheet of glass or plastic still separates the drawing instrument from the actual image. Moreover, these approaches preclude an artist from drawing on a sheet of paper (for example, to trace a drawing into or out of the computer)—because the sheet, if placed over the drawing surface, obscures the image being presented underneath. What's more, drawing on a clear surface such as glass conveys unsatisfactory tactile feedback. Furthermore, particularly with respect to liquid and active matrix displays, the present state of their technology is such that they lack sufficient spatial and color resolution, and contrast, to satisfy the needs and desires of some artists. In addition to all of the foregoing, these displays are expensive.

One technique known to exist in the prior art that attempts to solve the foregoing problem of registering a drawn input and resulting image in a computer drawing system is the apparatus and method described in Lippman, A., "And Seeing Through Your Hand," Proceedings of the Society of Information Display, Vol. 22/2, pp. 103–107 (1981). This article describes a method and apparatus using a half-silvered mirror interposed between a flat TV image projector (or flat-faced TV) and a digitizing tablet. The half-silvered mirror reflects towards the user the projected or displayed image as it is being drawn, in such a manner that the reflected image appears registered directly on top of the digitizing tablet. To the user, the image being drawn thus appears superimposed on and co-planar with the drawing surface. Depending on lighting used beneath the mirror to illuminate or not illuminate the tablet area, the user's hand can be made to appear in or to disappear entirely from the viewed image.

While the apparatus and method of Lippman provides an elegant approach to solving the general problem of superimposing input drawing and output image, the described apparatus suffers from a number of faults that limit its usefulness as a convenient and satisfactory artist's drawing tool. One thing lacking in the Lippman apparatus, for example, is any means to properly align input and output. Proper alignment is critical because, as previously stated, the human eye is extremely sensitive to parallax and registration errors at the close-in distances involved. It has been observed, for instance, that misalignment of input and output image by as little as one or two pixels (either laterally within, or orthogonally to, the plane of the digitizing surface) will be noticed by and disturbing to some artists. This misalignment can be caused by any of a number of mechanical and electronic factors. Mechanical misalignment can result, for example, from the simple shifting of system components, or a lack of precision in the construction of the apparatus. Electronic misalignment can result, on the other hand, from expansion or contraction of the image on the CRT or image projector, and by other image distortions (such as pincushion distortion, vignetting, etc.) common to such display devices.

Another problem with the Lippman apparatus is that the device is not adjustable in the manner of a conventional drafting table and, as a result, can be cumbersome and tiring to use over prolonged periods of time. This is a particularly compelling problem for commercial artists, who often sit and draw for hours on end. Such artists need to be able to adjust the height and orientation (rake) of their drawing easels to achieve comfortable and varied drawing positions, and to aid in their drawing.

Still another problem with the Lippman apparatus is that its lack of alignability limits a user's ability to use off-the-shelf or existing components for the monitor and digitizing tablet.

In view of the foregoing, it would be desirable to provide an improved computer graphics input/output device that facilitates accurately aligning an image drawn on a CRT or other imaging device to be on top of, and substantially coplanar with, an electronic digitizing tablet on which the image is being drawn.

It further would be desirable to provide such a device that can be adjusted over a wide range of positions and orientations in order to provide a comfortably positioned drawing surface, while retaining accurate alignment of input and image.

SUMMARY OF THE INVENTION

In view of the foregoing, it is an object of the present invention to provide and improved computer graphics input/output device that accurately superimposes on a digitizing tablet an image being drawn on the tablet.

It is a further object of the present invention to provide such a device that allows for accurate registration of input drawing and output image.

It is yet a further object of the present invention to provide such a device that allows a user to readily adjust the position of the drawing tablet over a wide range of positions and orientations, while maintaining accurate registration of input and image.

These and other objects of the present invention are accomplished by an improved computer graphic workstation in which images can be drawn directly into a computer using a pen-based digitizing tablet, or substantially any other flat, two-dimensional input device such as a touch-pad (hereafter collectively "digitizers"). The apparatus is capable of accurately superimposing an image being drawn by a user directly on top of, and substantially coplanar with, the drawing surface of the digitizer. The workstation provides, moreover, for rapid and convenient mechanical adjustment to achieve accurate alignment of input and output to minimize parallax and other distracting effects of misalignment. Programmable means additionally are provided for adjusting an image produced by a CRT or other optical imaging device to optimize alignment of input and image over the drawing surface, and to compensate for image distortions inherent in such imaging devices. The workstation can be adjusted over a wide range of positions and orientations, in order to accommodate a variety of drawing styles and comfort preferences, without misalignment of input drawing and output image.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which:

FIGS. 2A–D show more detailed views of the monitor frame assembly of the apparatus of FIG. 1;

FIGS. 3A–C show more detailed views of the yoke assembly of the apparatus of FIG. 1;

FIGS. 4A–C show more detailed views of the digitizer frame assembly of the apparatus of FIG. 1;

FIGS. 5A–D show more detailed views of the beam splitter assembly of the apparatus of FIG. 1;

DETAILED DESCRIPTION OF THE INVENTION

Figure 1:
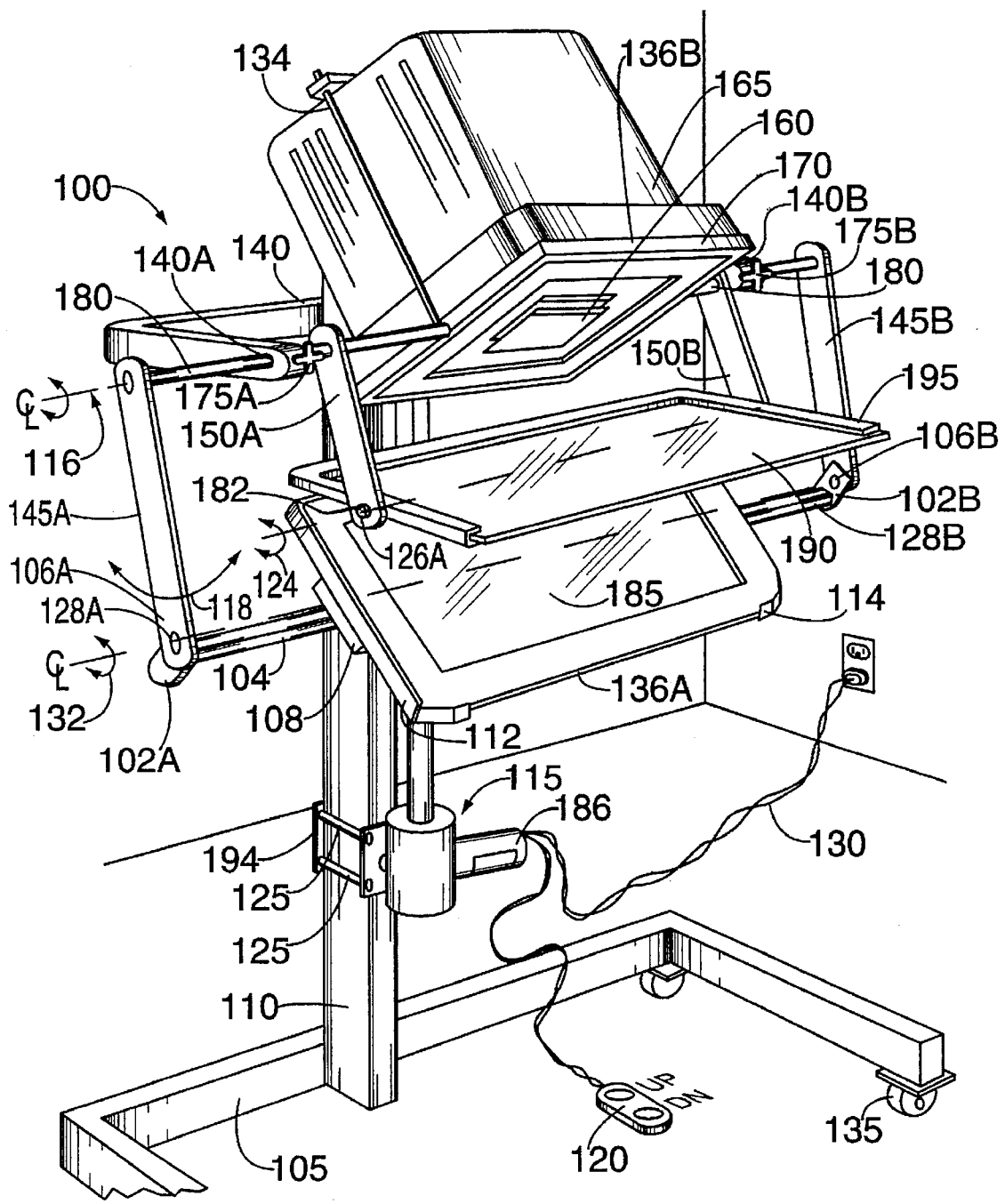
FIG. 1 shows a perspective view from the front and side of a virtual easel for a computer graphics workstation incorporating principles of the present invention.

FIG. 1 shows a perspective view of the front and side of an exemplary embodiment of an apparatus 100, called a "virtual easel," incorporating principles of the present invention. Virtual easel 100 includes an imaging device in the form of CRT monitor 165 on which appears an image 160. (While shown in FIG. 1 as a CRT monitor, persons skilled in the art will recognize that the imaging device could as well be a liquid crystal or active matrix display, or a projector that throws an image onto a flat surface situated where the face of the CRT is in FIG. 1.) Image 160 is of a drawing being made in real time by a user of the workstation on the surface of digitizing tablet 185. (Although not shown, a piece of paper could be on the digitizing tablet on which the artist is drawing. Of course, a drawing can be entered using digitizer 185 without using paper.) The image portion (i.e., the phosphor surface) of the CRT of monitor 165 preferably is flat. As discussed below, however, curved CRTs may also be used with the invention. An exemplary flat, square CRT monitor that may be used with the invention is the model ZCM-1790 high-resolution color monitor, available from Zenith Data Systems of Buffalo Grove, Ill.

Substantially any type of digitizing tablet is suitable for use with the invention, provided that the tablet's resolution is sufficiently high for the task at hand. An exemplary digitizing tablet is the model SD-311E graphics tablet, available from Wacom Technology Corp of Vancouver, Washington. This tablet uses a cordless, pressure-sensitive stylus to produce positional X, Y data pairs for transmission to a host computer at a resolution of as much as 1270 lines per inch. The digitizing surface of the Wacom tablet is black, which has advantages as discussed below. Also as discussed below, it is preferable (although not required) that the digitizing tablet have a drawing surface larger in one or both dimensions than the image projected by the CRT, in order to provide a convenient means of entering control and other data into the workstation in addition to the data representing a drawing being made. The aforementioned Wacom digitizer has an active digitizing area of 12 by 18 inches, whereas the image projected by the CRT is only about 12 by 9 inches.

The digitizer and monitor are coupled, in conventional fashion, to a personal computer (not shown) running a desired, off-the-shelf drawing program. Preferably, the computer is an SGI Onyx (available from Silicon Graphics, Inc. of Mountain View, Calif.) running a software package called "Studiopaint" (available from Alias Research, Inc. of Toronto, Canada). The Onyx machine is a MIPS R4000-based computer having sufficient processing power to enable the image appearing on monitor 165 to be displayed in real time at the rate at which the image is being drawn on digitizer 185. Of course, other computers (such as IBM-compatible or Apple Macintosh computers) that meet a user's needs may be used instead. The particular computer and drawing software used is not critical to the invention.

In order to be used with the invention, it is important that monitor 165 scan its images in reverse so that left and right are swapped. This is important because, as further discussed below, the user of the apparatus of FIG. 1 sees a reflection of the image off of the surface of a beam splitter 190. Reversing the scanning of monitor 165 allows reflected images and writing to appear properly to the user rather than reversed. No monitor is known that has the ability easily to reverse its scanning. In the absence of such a monitor, one exemplary way that has been found to accomplish this image reversal is to switch the horizontal deflection coil wires within the monitor itself. Alternatively, and less preferably, the computer driving the monitor can be modified through software and/or hardware means to cause its frame buffer to be filled (or read out) backwards.

Monitor 165 is mounted in a monitor frame 170 such that the image on the face of the CRT faces obliquely downwards and towards a beam splitter comprising a sheet of glass 190 mounted in glass frame 195. While glass is preferable for the beam splitter, persons skilled in the art will recognize that other materials having properties of the type described herein—such as plastic or clear ceramic—may be substituted. Beneath beam splitter 190 is mounted digitizing tablet 185 in a tablet frame 112. Monitor 165 is secured to frame 170 by a strap 134 extending from either side of frame 170 to the other side, and behind the monitor. In a prototype embodiment of the virtual easel, strap 134 is actually pair of threaded metal rods extending along either side of the monitor, each bolted at the back of the monitor to a flat piece of metal extending behind the monitor. Persons skilled in the art will appreciate that substantially any other method or apparatus for securing monitor to frame 170 may be employed (including, for example, molding the plastic shell of the monitor at the time of manufacture to be part of the frame itself, such as by constructing the apparatus of the invention out of a high-strength plastic material, so that no external strap or other securing mechanism is required).

FIGS. 2A–C show more detailed views of the monitor frame assembly of FIG. 1. These figures show monitor frame 170, in relation to other components connected or coupled to it, from the frame's top, front and right side (respectively). As shown in FIGS. 1 and 2A–C, monitor frame 170 is rigidly fixed to an axle 180 extending, in two parts, left and right of monitor frame 170 along a first or master axis 116. Axle 180 passes through bores in yoke 140 at points 140A and 140B, such that axle 180, monitor frame 170 and monitor 165 may be rotated as a unit about master axis 116 relative to yoke 140. Screw clamps 175A and 175B are threaded through yoke 140 in order to clamp down on axle 180. Clamps 175A and 175B, when screwed in, press tightly against axle 180 in order to fix the axle and, hence, monitor frame 170 and monitor 165—in a desired angular orientation relative to yoke 140. When clamps 175A and 175B are loosened by being unscrewed, monitor 165 may be rotated by the user with monitor frame 170 relative to yoke 140 as further discussed, below, to provide for adjustment of the viewing angle of the apparatus.

Coupled to axle 180, as also shown in FIGS. 1 and 2A–C, are a first (external) pair of left and right links 145A and 145B, and a second (internal) pair of left and right links 150A and 150B. These four links are each attached at one end to axle 180 so that their distant ends swing about master axis 116 in the manner shown by arrow 118 (FIG. 1) as axle 180 is rotated. In the apparatus of FIGS. 1 and 2A–C, the links are adjustably attached to axle 180 by means of set screws extending through the links to the axle. Preferably, however, common screw-type locking collars (such as collar 240 shown in FIG. 2D) or quick-release clamps may be used. As shown in FIGS. 2C and 2D, loosening the set screws (or clamps) allows the angular orientation of the links to be varied relative to the monitor frame and each other, and then fixed in place by screwing or clamping the links in place. This is one way in which opto-mechanical alignment of virtual easel 100 may be accomplished as further discussed, below.

Alternatively, either or both pairs of links may be rigidly secured to axle 180 at the time of manufacture without possibility of adjustment, if manufacturing tolerances are sufficiently high. Rigidly securing the links to the axle may be less desirable, however, because the adjustability of the size of the easel's "mouth" is reduced. The mouth of the easel is the size of the opening (front and back) between digitizer tablet and monitor frame. The front of the mouth is the vertical distance from the front of the digitizer at point 136A to the monitor frame at point 136B (see FIGS. 1 and 2C). Similarly, the size of the back of the mouth is the vertical distance from the rear of the digitizer at point 136C to the monitor frame at point 136D (see FIG. 2C). As shown in FIG. 2C, with links 150 and 145 pivotable about axis 116, and monitor frame 170 and digitizer 185 pivotable as well, the size of both the front and back of the mouth may be varied in connection with aligning the device. This allows the easel to be aligned, as hereafter described, by opening both the front and rear of the mouth simultaneously to provide an artist adequate room to draw without the beam splitter getting in the way of the stylus. In other words, both the front and back of the mouth can be opened or closed individually (substantially independently of one another) while aligning the machine. This independence results because the digitizer can nutate or swing about the master axis, as well as rotate about its own axis. The beam splitter can nutate as well. On the other hand, if links 145 and 150 are fixedly secured to axle 116, the front and rear of the mouth cannot simultaneously be increased or decreased. In this case, if either the front or rear mouth opening is either increased or decreased, the other opening will—of necessity—respectively decrease or increase. As a result of this, opening the front of the mouth to be very wide will cause the rear of the mouth to become very narrow, and vice versa. This narrowing of the rear of the mouth could result in the artist not having enough clearance to comfortably use a drawing instrument near the rear of the digitizer.

Referring to FIGS. 1 and 2C, pivotally coupled to the distant ends of internal links 150A and 150B is glass frame 195, which holds beam splitter 190 preferably formed of a sheet of glass. More detailed views of the glass sheet and glass frame are shown in FIGS. 3A–C (showing front, top and side views of the glass and frame). Glass frame 195 is pivotally coupled to internal links 150A and 150B via axles 182 disposed on opposite sides of the frame. This allows glass frame 195 and beam splitter 190 to be rotated as a unit about beam splitter axis 124. As shown in FIG. 1, axis 124 preferably bisects glass 190 along its longitudinal dimension. Clamp 126A (and an identical clamp 126B for link 150B, not shown in FIG. 1) allows a user of virtual easel 100 to rotate glass 190 to a desired angular orientation relative to monitor image 160, and to fix the glass at that position. Clamps 126A and 126B may be screws that thread into frame 195 to form the axles and which, when screwed, tighten the frame and links against one another. Alternatively, the clamps can be substantially any other mechanism that allows tightening frame 195 to links 150A and 150B.

At the far end of external links 145A and 145B are, respectively, a pair of secondary links 102A and 102B. These secondary links are pivotally coupled at one end to the external links at pivot points 106A and 106B, and fixed at their opposite ends to bar 104. Attached to bar 104 is a spacer 108, to which in turn is attached digitizing tablet frame 112. The purpose of spacer 108 and secondary links 102A and 102B is to accommodate for the thickness of digitizing tablet 185, in order to cause its drawing surface to be capable of rotation about axis 132 extending across the surface. Clamps 128A and 128B allow a user to adjust the drawing surface of tablet 185 to a desired angular orientation about tablet axis 132, relative to glass 190 and image 160, and to fix the tablet in that orientation. As discussed below, this rotational capability is an aspect of the apparatus that facilitates aligning a drawing being made on digitizer 185 and its image being displayed by monitor 165. More detailed top, front and side views of digitizer frame 112, rod 104, secondary links 102, spacer 108 and associated components are shown in FIGS. 4A–C.

The base assembly of virtual easel 100 is shown in detail in FIGS. 5A–C (portions of that assembly also are depicted in FIG. 1). FIG. 5A is a view of the assembly looking up from the floor, while FIGS. 5B and 5C are views from the rear and right side, respectively. The base assembly includes a base 105 riding on four casters 135. A vertical support member 110, attached to the base, includes a side-grooved linear bearing raceway 142A bolted to it. A block 142B, bolted to the rear of yoke 140 (not shown in FIG. 5), is slideably coupled to the linear bearing raceway via ball bearings disposed in the block and engaged with the raceway's grooves. An exemplary linear bearing and raceway system that may be used with the apparatus of FIG. 1 is commercially available from THK Co., Ltd. of Tokyo, Japan as the LM guide, type HSR. The linear bearing allows yoke 140 to be moved linearly up and down and, thus, to be positioned along with monitor 165, beam-splitter glass 190 and digitizing tablet 185—at different desired heights relative to the floor. The positioning is accomplished by a motor-driven actuator assembly 115 (FIG. 5C and 5D), also mounted to vertical support member 110 via bolts 125 and plate 194, that is controlled by a foot pedal 120. The actuator positions yoke 140 along vertical member 110 by motor 186 causing a shaft 144, coupled at one end to yoke 140 (not shown) by a clevis 188, to telescope out of or to retract into a tube 146 (see FIG. 5D). An exemplary actuator that may be used with the apparatus of FIGS. 1 and 5 is a model 6405 series of Mini-Pac actuator with built-in clutch, made by Duff-Norton, Inc. of Charlotte, N.C.

The glass sheet forming beam-splitter 190 is at least partially reflective. This is to cause light rays emanating from the CRT of monitor 165 that represent an image being drawn to be reflected to a user situated in front of the virtual easel, and to allow light rays emanating from the drawing surface to pass through the glass to intersect in the eye of the user the light rays of the reflected CRT image. (Through this arrangement, the artist's hand can be made to appear or to disappear depending on the level and character of the illumination beneath the glass.) This intersection of light rays causes image 160—which is the image of the drawing being made by the user on digitizing tablet 185—to appear superimposed on the drawing surface of tablet 185. The reflectivity of the beam splitter can be varied depending on the amount and type of coating used on the surface of the glass. The coating, for example, can be made by depositing silver, aluminum or some other metal on the top of the glass (the side facing the monitor). Or, a layer of a dielectric or a holographic reflector material can be applied. In the embodiment of FIG. 1, a reflecting material is applied to produce a reflectivity coefficient of about 18% (meaning that only 18% of incident light is reflected). It will be appreciated by persons skilled in the art, of course, that 18% reflected light may not be optimum in all conditions. For example, if the CRT is relatively dim (as would be the case with a pi cell shuttered color sequential CRT), greater than 18% reflectivity would be desired. Generally speaking, however, it has been found that the most desirable reflectance is 18% under normal viewing conditions (where the luminance of the CRT is greater than 60 foot-Lamberts, and the ambient light in the room is approximately 60 foot-candles).

Applied to the other face of glass 190 is a coating of anti-reflective ("AR") material, such as magnesium fluoride or, preferably, a broad band, multilayer, dielectric, thin film quarter wave stack of alternating high, low index of refraction. Such thin films are commercially available from Optical Coating Labs, Inc. of Santa Rosa, Calif. The AR coating decreases the reflectivity of the far side of the glass from about 4%, in the typical case for untreated glass, to about 1%. This is done in order to reduce to the extent possible "ghost" images caused by reflections of image 160 off of the far surface of the glass. Using a combination of partial silvering and an AR coating with the beam splitter improves contrast in the reflected image seen by the user, as compared to a beam splitter that used partial silvering only.

Virtual easel 100 allows an artist or other user easily to align input and output in order to cause an image displayed by the CRT to appear coincident (i.e., aligned in the X, Y and Z planes) with the drawing being made on the digitizer. Once this alignment has been accomplished, the height and rake (slant) of the drawing surface can be adjusted, in the manner of a convention easel, in order to accommodate the artist's working preferences. The apparatus allows these adjustments to be made without having to re-align input and output.

The alignment process for the apparatus of FIG. 1 is further illustrated in FIG. 7. FIG. 7A shows a situation in which the surface of digitizer 185 and the image 160 being projected by the monitor are, as perceived by a user looking at the image reflected in beam splitter 190, out of alignment in each orthogonal direction. In this figure, the drawing area of digitizer 185 has an origin at 0,0,0 in a coordinate system designated by axes $X_d, Y_d, Z_d$. Similarly, the image 160 produced by the monitor's CRT, as seen in reflection by the user, has an origin in a "virtual" space as shown by axes $X_v, Y_v, Z_v$. FIG. 7B shows the first step of the alignment process, in which links 150A,B and/or 145A,B are adjusted until axes $X_v$ and $X_d$ are substantially coplanar. Next, either or both of beam-splitter 190 and tablet 185 are pivoted about their respective axes 124 and 132 until axes $Z_v$ and $Z_d$ are substantially parallel (see FIG. 7C). After this step, as FIG. 7C shows, the planes defined by the surface of digitizer 185 and the virtual image are substantially coplanar. To complete alignment of image and drawing, all that remains to be done is to align the Y axes. This is accomplished, as shown in FIG. 7D, by spinning the image about the $Z_v$ axis until axes $Y_d$ and $Y_v$ are substantially parallel. This last alignment may be accomplished by adjusting four set screws 198 in tablet frame 112 (see FIG. 4A). These screws are threaded into frame 112, and press against the sides of tablet 185. By screwing or unscrewing these four set screws, tablet 185 may be rotated slightly about the Z axis to align the X and Y axes. Set screws 198 serve also to frictionally secure digitizer 185 in frame 112.

The foregoing alignment procedure may readily be accomplished by eye. It has been observed that alignment of input drawing and output image may typically be achieved, by eye, to within one or two pixels. It also has been found preferable that the alignment be such as to cause the image to appear situated just above the digitizer surface. This tends to enhance the perception that the imaged "ink" is flowing out of the digitizing stylus. In addition, aligning the image to be just above the digitizing surface accommodates drawing on a piece of paper placed on the digitizer, which causes the tip of the drawing instrument itself to be raised slightly above the drawing surface.

Once virtual easel 100 has been aligned, as described above, the vertical position of the drawing surface of digitizer 185, as well as its angular orientation (rake), may be adjusted relative to the user without disturbing that alignment. Virtual easel 100 thus may be adjusted in a variety of positions and orientations, to suit the comfort and drawing needs or desires of an artist, similarly to the way in which a conventional drawing easel may be adjusted. Adjustment in height (position) is achieved by use of foot pedal 120, as earlier described, to move the entire mechanism (monitor, beam-splitter and digitizer) up or down as a unit. Adjustment of the rake (orientation) of digitizer 185 is achieved by loosening clamps 175A and 175B, and rotating the apparatus (monitor, beam splitter and digitizer) as a unit about master axis 116.

Figure 6A:
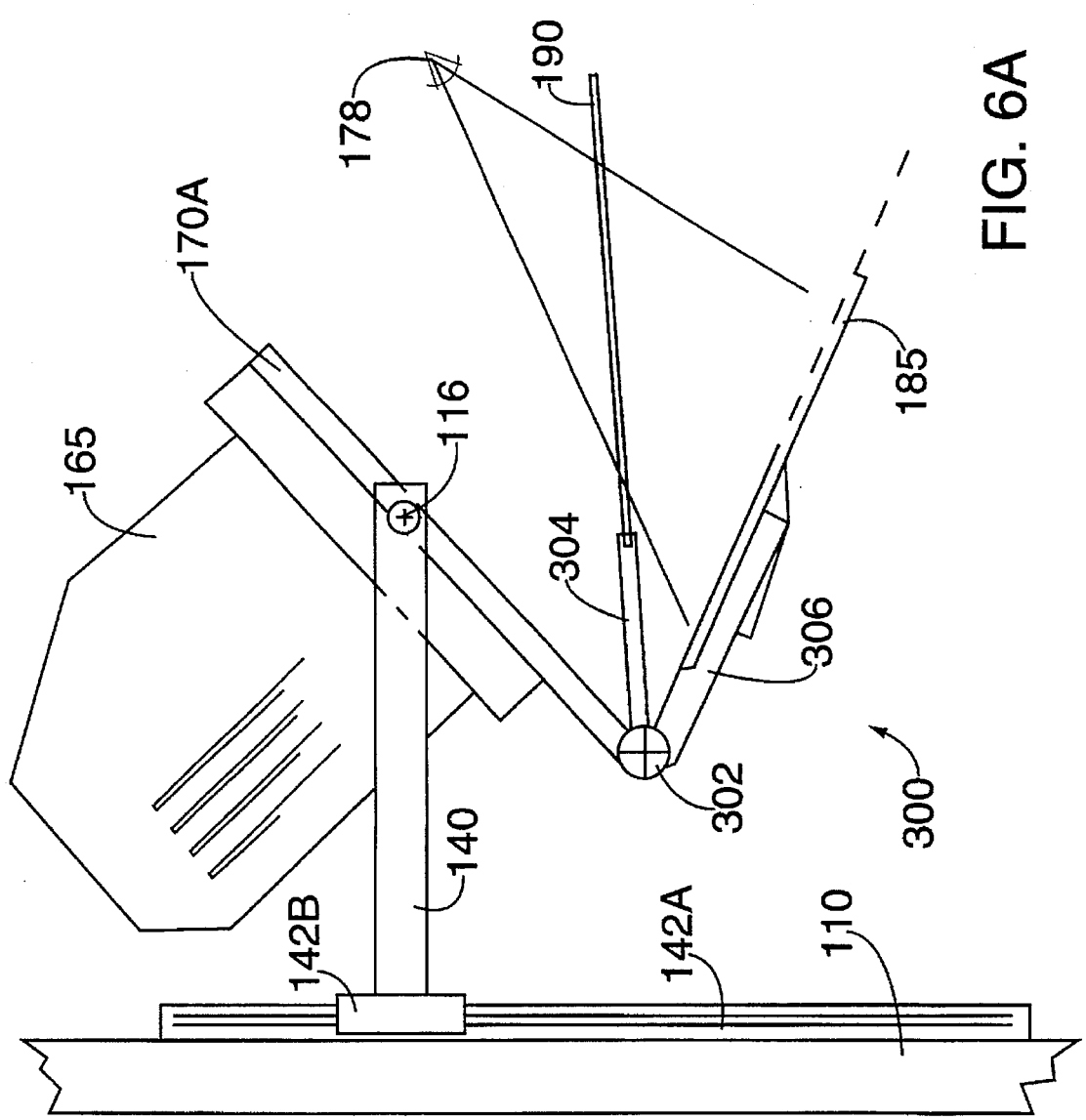
FIGS. 6A–B show an alternative embodiment of the invention.

An alternative embodiment of the invention is shown in FIG. 6. FIG. 6A is a side view of a virtual easel 300. Monitor 165 is mounted in a monitor frame 170A which is pivotally mounted to a yoke 140. The yoke, as was the case in FIG. 1, is slideably mounted to vertical support member 110 via linear bearing raceway and block 142A and 142B, respectively, to support the apparatus vertically off of the floor. Monitor 165 and monitor frame 170A may be adjustably pivoted about master axis 116. The monitor frame 170A extends below monitor 165 to a secondary axis 302, where it is pivotally coupled to beam splitter 190 via beam splitter support member 304 and to digitizer tablet 185 via digitizer support member 306. As in the case of FIG. 1, the beam splitter is partially reflective on its surface closest to the monitor and, preferably, coated on its surface closest to the digitizer to reduce reflections from that surface, in order to cause images from monitor 165 of a drawing being made on digitizer 185 to be reflected ghost-free to eye 178 of an observer.

Figure 6B:
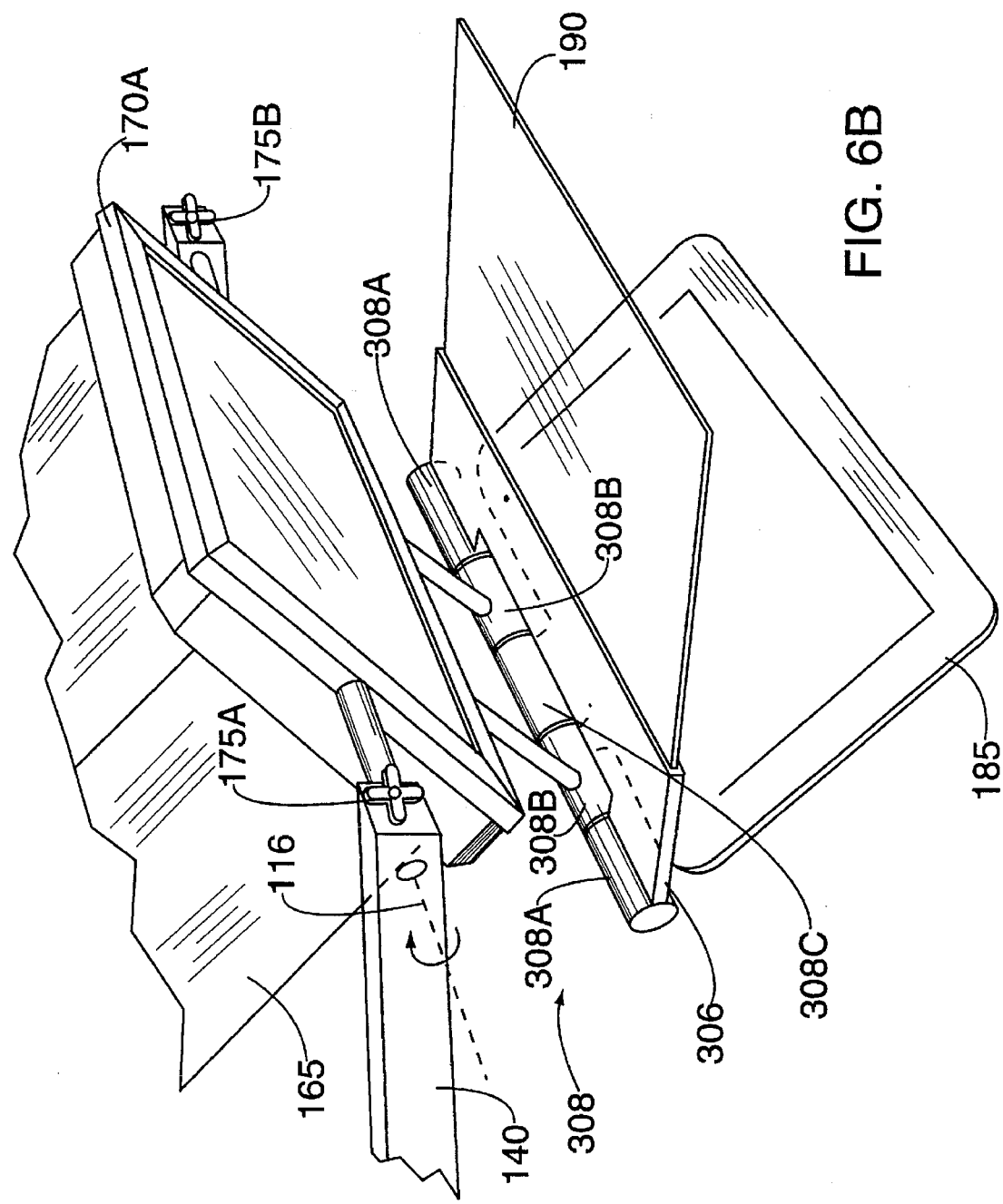
Figure 7B:
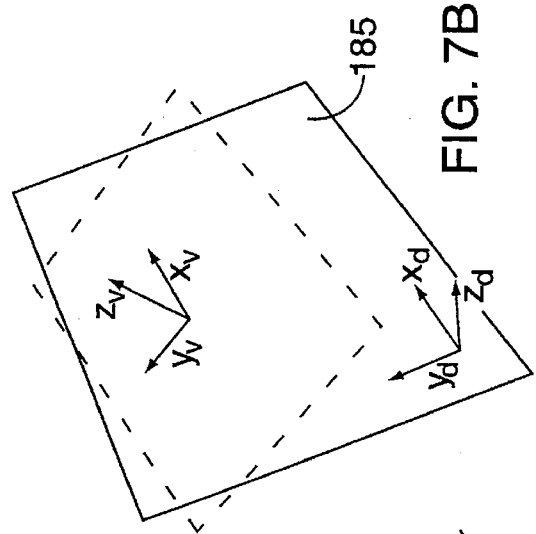
FIGS. 7A–D depict a methodology for aligning the apparatus of FIG. 1.
Figure 7D:
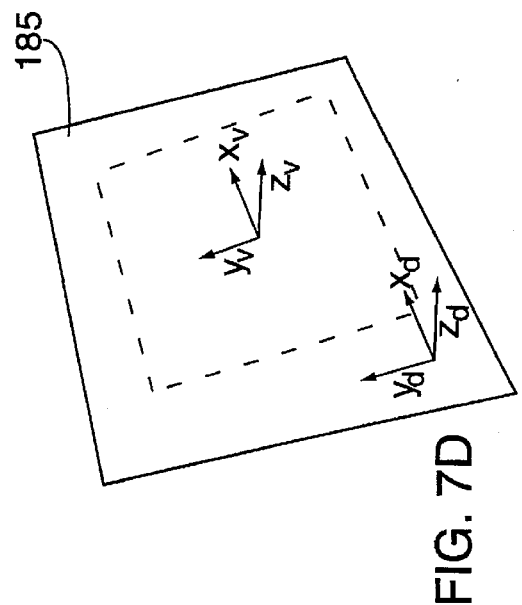
Figure 7A:
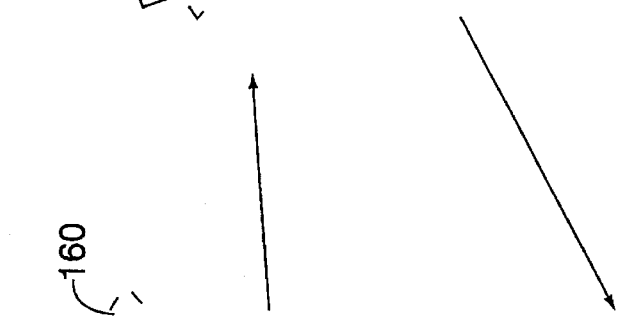
Figure 7C:
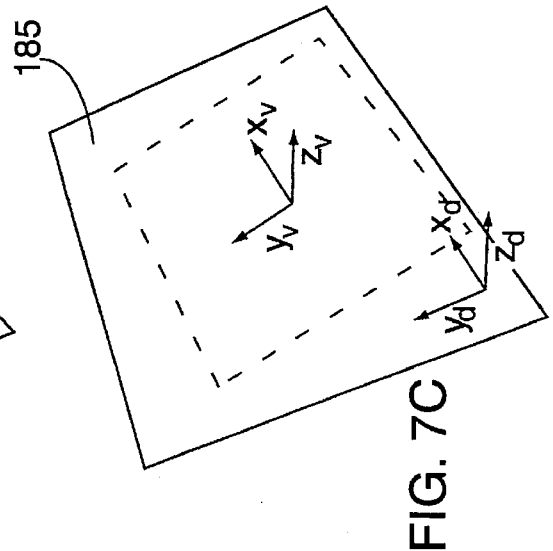

FIG. 6B shows a front/side perspective view of easel 300 of FIG. 6A. This figure shows monitor frame 170 coupled to two sections 308B of a three-part piano hinge 308. Also coupled to the piano hinge, via sections 308A, is beam splitter support member 304 to which beam splitter 190 is attached. Digitizer 185 is pivotally coupled to the piano hinge via support member 306 (not visible) to attached to section 308C of the hinge. Finally, clamps 175A and 175B allow monitor frame 170A to be pivoted about master axis 116.

As will be apparent from inspection of FIGS. 6A and 6B, beam splitter and digitizer may be pivoted independently of one another with respect to monitor 165 and monitor frame 170A. This allows a user to align the device to cause images of a drawing being drawn by a user on digitizer 185, that are produced by monitor 165 and reflected off of beam splitter 190, to appear substantially coincident with that drawing. To achieve the alignment, beam splitter is adjusted to be in a desired orientation, and then the digitizer is adjusted in orientation until the input drawing and output image appear to be in substantial coincidence. Thereafter, if it is desired to adjust the position and/or rake of the digitizer, the yoke may be raised or lower via the linear bearing and/or monitor 165 may be rotated. Such adjustments in position and orientation do not upset the alignment of the system.

One disadvantage of easel 300 of FIG. 6, as compared to easel 100 of FIG. 1, is that the mouth of easel 300 cannot be adjusted over as wide a range (front and back) as can that of FIG. 1. This is because the secondary axis in FIG. 6 is fixed at the piano hinge. In FIG. 1, however, the axis corresponding to the secondary axis (shown in FIG. 2C as item 236) is imaginary. The embodiment of FIG. 1 allows imaginary secondary axis 236 to move towards or away from the front of the mouth, depending on the settings of links 150 and 145. Thus, the apparatus of FIG. 1 allows for a greater combination of openings of the front and back of the mouth than can be achieved by the embodiment of FIG. 3. However, the apparatus of FIG. 6 has advantages in size, weight, and "openness" (because of the absence of the links along at the sides of the digitizer).

Persons skilled in the art will recognize that various modifications can be made to the apparatus of FIG. 6 without departing from the invention. For instance, rather than coupling the yoke to the monitor frame to provide for adjustment of the position and orientation of the apparatus relative to a user, the yoke or other support mechanism could as well have been coupled to the piano hinge, or to the digitizer support. Or, the yoke could be removed entirely and the digitizer could have adjustable legs fitted to the rear of its underside. Such legs would allow the apparatus to be placed on a table top, with the orientation of the digitizer relative to a user being adjustable without causing misalignment of input drawing and output image.

The alignment and adjustment procedures heretofore discussed were based on an assumption that image 160 produced by the CRT of monitor 165 was perfect. That is to say, the assumption was that a perfect square drawn on digitizer 185 produced a perfectly square image. Even assuming that the image on the CRT as produced by the monitor was reasonably exact (i.e., the monitor did not suffer from pin-cushion or other electronic forms of distortion), however, most monitors do not produce perfectly flat images as seen in reflection off of the beam splitter. This is because an assumption made for the apparatus of FIG. 1 (and FIG. 6) was that the CRT of monitor 165 was completely flat. Most commercially available CRTs, however, are not flat. Rather, most are curved in one or more dimensions. Curved monitors are typically less expensive than flat ones, but the curvature of the image produced by such monitors is unacceptable for use with the invention due to the resulting curvature of the virtual image produced by the beam splitter. One way to compensate for such curvature is to similarly curve the surface of digitizer 185. This solution is not preferred because most artists are used to drawing on a flat surface.

Figure 8A:
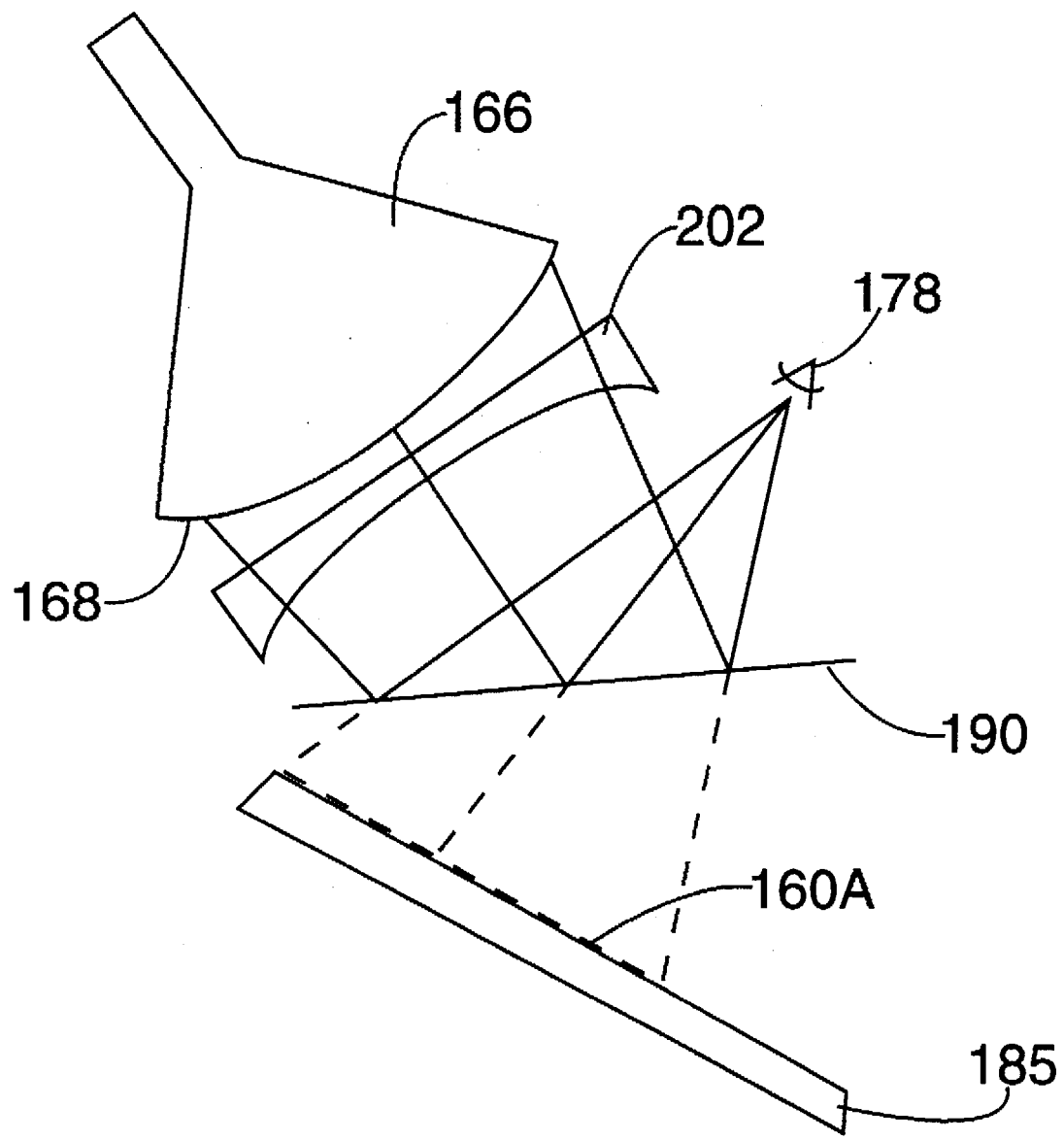
FIGS. 8A–C show exemplary mechanisms for reducing image curvature produced by curved CRTs.
Figure 8B:
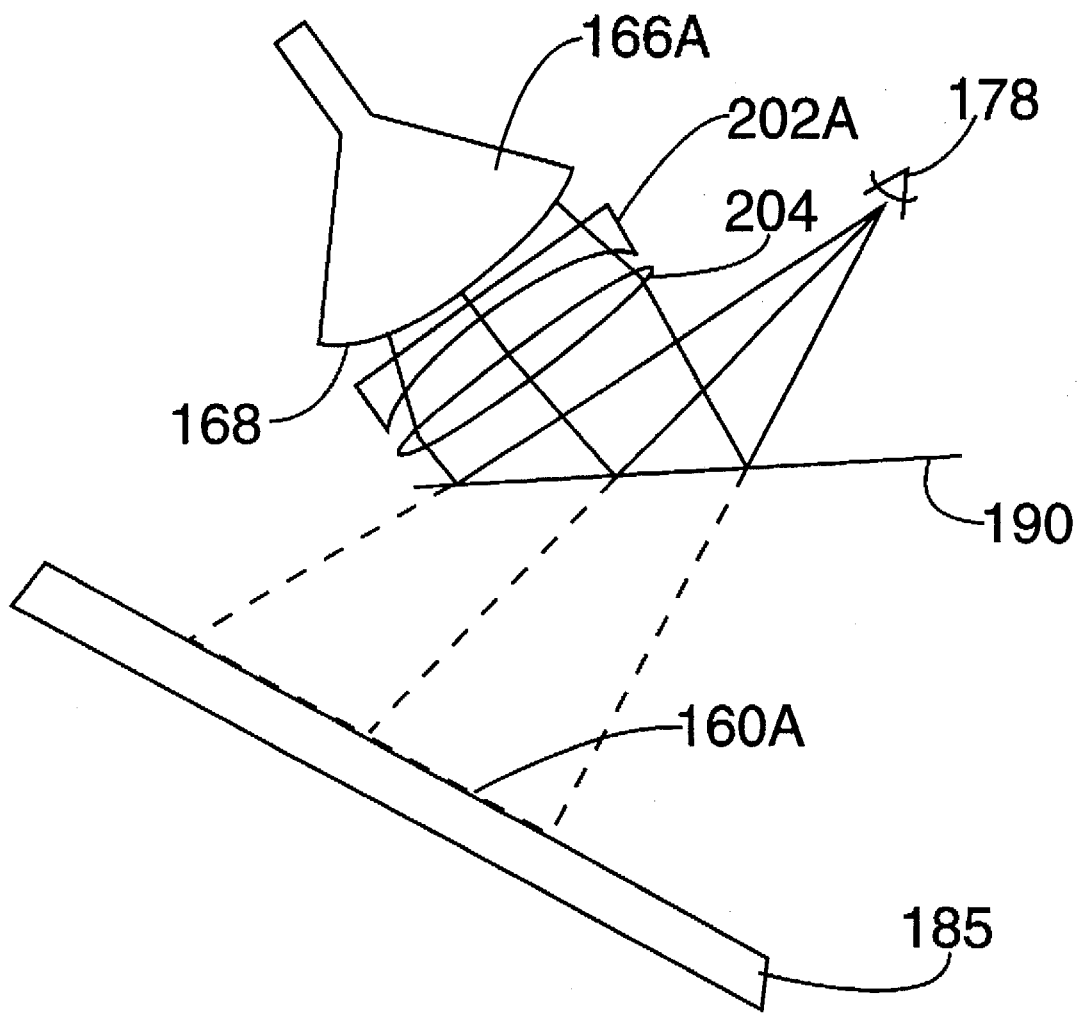
Figure 8C:
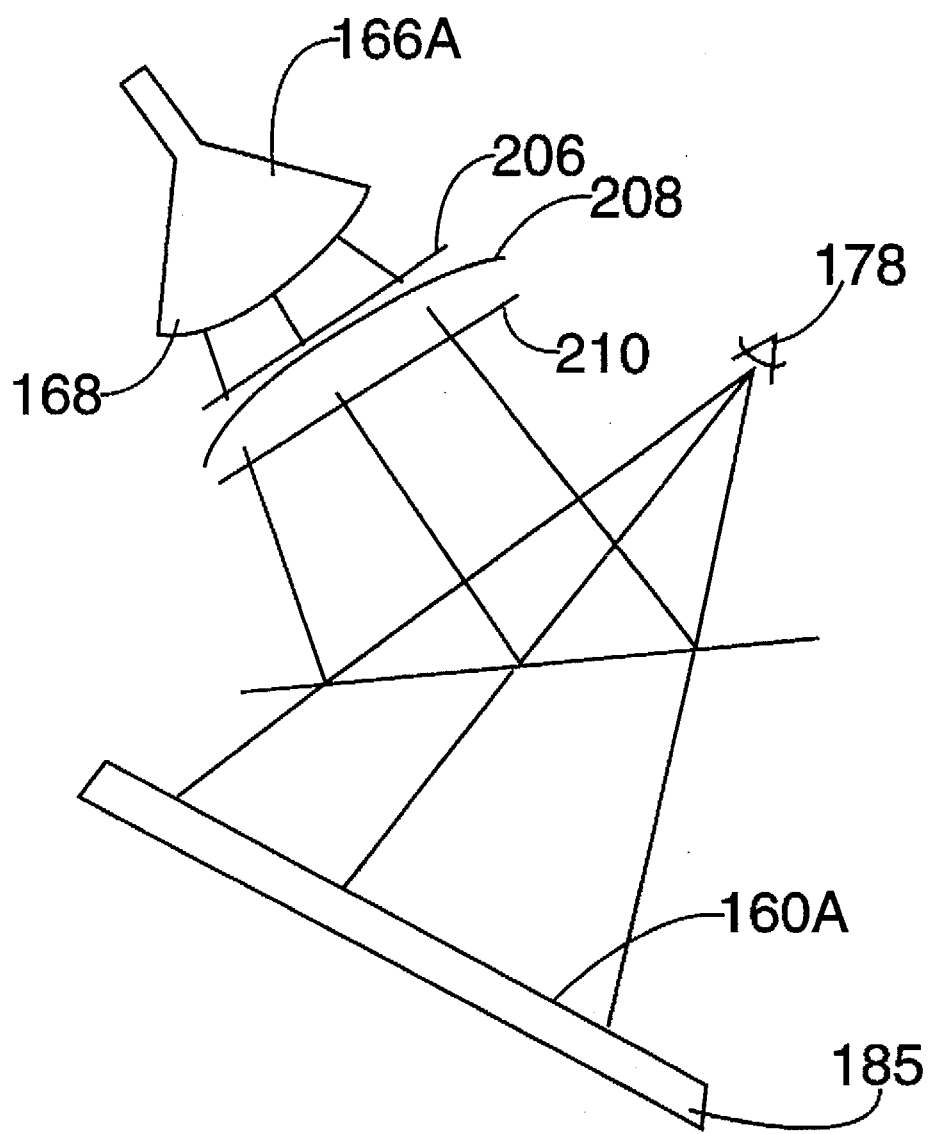

Another aspect of the present invention, however, allows even curved monitors to be used with flat digitizing surfaces in virtual easel 100 in such a manner that acceptable alignment of input and image can still be achieved. Assuming now that monitor 165 of FIG. 1 is curved rather than flat, alignment may still be achieved as heretofore described by interposing a field flattener between the CRT of monitor 165 and beam splitter 190. The field flattener is designed, based on the specific equations of the curvature of the CRT's surface, to impose a substantially opposite curvature on the light rays passing through the flattener to cause the image formed on beam-splitter 190 to now be flat instead of curved. FIGS. 8A–C show various exemplary ways in which such a field flattener may be devised.

FIG. 8A shows a side view of a monitor's CRT 166. The CRT has a curved face 168 on which image 160 (not shown) of a drawing being made on digitizing tablet 185 is displayed. Light rays emanating from the CRT (shown by solid lines) reflect off of beam splitter 190 and focus at the eye 178 of a user. By virtue of the placement of digitizing tablet 185 relative to the beam splitter and the CRT, as heretofore described, FIG. 8A shows (via dotted lines) that a virtual image 160A of what is being drawn appears superimposed on the surface of digitizer 185. In order to compensate for the curvature of CRT 166, FIG. 8A also includes a field flattener 202. The field flattener is a plano-concave lens, having a size at least that of the face of the CRT, shaped in such a manner so as to compensate for the CRT's curvature. Alternatively, a bi-concave or a negative meniscus lens may be used. For reasons of light weight and reduced expense, the lens preferably is made of a high-index, compression-molded plastic such as polystyrene or polycarbonate. The particular shape of the lens will depend, of course, on the particular CRT with which it is to be used. Once the curvature of the surface of the CRT, and the image and object distances, are known, the specific curvature required for lens 202 to produce a flat image at beam splitter 190 may be calculated in a straight-forward manner. The techniques to accomplish these calculations, and to produce lens 202, are well known to persons of ordinary skill in the optics art.

FIG. 8B shows another way of achieving a flat image with a curved CRT. In this figure, CRT 166A is not only curved but also produces an image that is smaller than the size of the desired image. Such a CRT has several advantages. For one thing, the use of a small CRT in virtual easel 100 can significantly reduce the size, weight and overall bulk of the easel as compared to the apparatus shown in FIG. 1. Another advantage is that small CRTs are less expensive than large ones. To compensate for the smaller image produced by CRT 166A in FIG. 8B, an additional lens 204 is interposed between field flattener 202A and beam splitter 190 to magnify the image to the desired size. Magnifying lens 204 is preferably made of an acrylic plastic or other material the properties of which compensate to some degree for chromatic aberration caused by field-flattener 202A. The particular optical design of the magnifying lens will depend on the magnification desired, the image and object distances involved, and viewing exit pupil dimensions. In the embodiment of FIG. 8B, the curvature of field flattener 202A is preferably modified from what is required in FIG. 8A in order to compensate as well for any field curvature and associated distortion introduced by the magnifying lens.

Still another way of flattening the field of a curved CRT for use in virtual easel 100 is to use a "pancake window," an example of which is diagrammatically illustrated in FIG. 8C. In this figure, CRT 166A is both curved and smaller than the desired. image. Field flattening and magnifying are accomplished using a combination of a circular polarizer 206, a concave mirror 208, and a cholesteric reflector 210. Polarizer 206 causes light passing through it from CRT 166A to be left-circularly polarized in a conventional manner (an example of material that will impart left-circular polarization to randomly polarized light is a linear polarizing sheet (e.g., Polaroid 1) laminated to a quarter wave retarder (e.g., Mica). If the axis of linear polarization is oriented at a 45 degree angle to the crystalline optical axis of the quarter wave retarder, then the transmitted light will be left circularly polarized. The circularly polarized light then passes through mirror 208, which is partially silvered, and strikes cholesteric reflector 210. A property of cholesteric reflector 210 is that it reflects light which is left-circularly polarized and transmits light that is right circularly polarized. Accordingly, the left-circularly polarized light transmitted through mirror 208 is reflected back to the mirror's concave surface, which magnifies and flattens the image. The reflected light, which is now right circularly polarized (because left circularly polarized light incident upon a conventional reflector undergoes a 180 degree phase shift, and is therefore reflected as right circularly polarized light), passes through cholesteric reflector 210 towards the beam splitter. Cholesteric reflector 210 preferably is formed from a thin layer of cholesteric liquid crystal coated on a transparent optical flat, commercially available from Kaiser Electro Optics, Inc. of Carlsbad, Calif.

Other known embodiments of a pancake window can also be used with the invention, such as those that rely on quarter wave retarders and plane polarizers.

An advantage of using a pancake window such as shown in FIG. 8C, as compared to using lenses as shown in FIGS. 8A and 8B, is that the field curvature of mirror 208 is opposite from that of the CRT. Thus, both magnification and field flattening may be accomplished simultaneously, and without introduction of chromatic aberration.

Figure 8D:
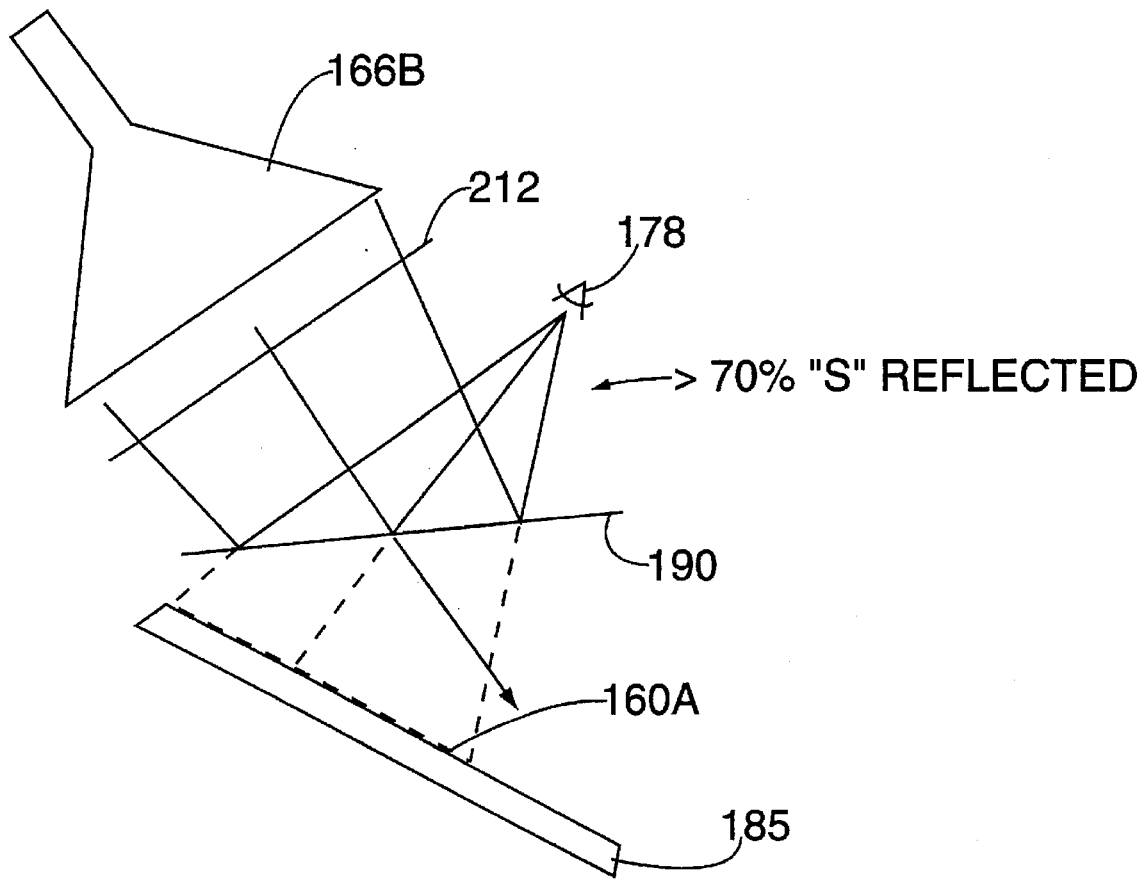
FIG. 8D shows an exemplary mechanism for optically increasing the brightness of a reflected image.

Still another way to implement virtual easel 100 is shown in FIG. 8D. The implementation shown in FIG. 8D is particularly suited to improving the reflection efficiency of displays—like pi cell shuttered color sequential CRTs, or LCDs—the light of which, of necessity, is plane polarized.

In FIG. 8D, CRT 166B is a flat pi cell shuttered color sequential CRT (or a twisted nematic LCD) oriented in such a manner as to place the plane of polarization at a 90 degree angle to the plane of incidence of light at the beam splitter. In situations where it is not convenient to arbitrarily orient the display, such as when the aspect ratio of the display is not square, or if the plane of polarization of light leaving the display is at 45 degrees to vertical, it is possible to rotate the plane of polarization of light coming from the display to the desired orientation by placing a half-wave retarder 212 between the display and the beam splitter, and then orienting the crystalline optical axis of the half wave retarder in relation to the incident plane polarized light in such a manner that the light transmitted through the half wave retarder is perpendicular to the plane of incidence. If, for example, plane polarized light coming from the display is parallel to the plane of incidence (P-polarized), then placing half wave retarder 212 between the display and the beam splitter, such that the crystalline optical axis of the half wave retarder is at a 45 degree angle to the original plane of polarization, will cause light transmitted through the half wave retarder to have its plane of polarization rotated 90 degrees with respect to its original plane of polarization.

The polarized light from CRT 166B strikes beam splitter 190 having a surface coated with a material that reflects "S" polarized light. An example of such a material is a stack of dielectric thin films, of alternating high and low index material. Such dielectric coatings commonly reflect S polarized light with an efficiency of greater than 70%. Optical Coating Labs, Inc. is a commercial source for such coatings. By reflecting upwards of 70% of S-polarized light, the arrangement of FIG. 8D operates to increase the brightness of the reflected image.

Still another feature of virtual easel 100, and an aspect of the present invention, is the integration of both real and virtual user interfaces. As shown in FIG. 1, and as earlier discussed, the active digitizing area of digitizer 185 is preferably larger than the virtual image superimposed on the digitizer's surface. This allows portions of the digitizing surface that are outside of the image area (hereafter the "external digitizing surface") to be used to control the graphics software tools made available to the artist by the software running on the associated computer. For example, a portion of the external digitizing surface may be used to control the colors that will be drawn, the type of effect that will be produced by the stylus (e.g., thin line, thick line, spray painting, etc.), and so on. These and many other tools are conventionally provided by most commercially available graphics software, but control and use of these tools in typical computer systems has typically been achieved by using a mouse or a keyboard. In some situations, the digitizing surface itself is used but with a device using a puck and cross-hairs. By dedicating a portion of the external digitizing surface to control and manipulate these software tools, using the same instrument used to draw on the digitizer, a convenient and intuitive interface may be provided to the artist. Transparent overlays placed over portions of the external digitizing surface may be used to specify particular areas of that surface which, when sensing the presence of the stylus, will cause activation or use of different ones of the available software drawing tools.

It will be appreciated by those skilled in the art that the present invention can be practiced and implemented by other than the described embodiments, which are presented for purposes of illustration and not of limitation. The present invention is limited only by the claims which follow:

What is claimed is:

1. A computer graphic work station adapted for including a digitizer, an imaging device for producing an image of a drawing being drawn by a user on the digitizer, and a beam splitter for at least partially reflecting the image produced by the imaging device to the eye of the user, the work station comprising:

first means for enabling the image produced by the imaging device to be pivoted about an image axis;

second means for enabling the digitizer to be rotated about the image axis and rotated about a digitizer axis to variably position and orient the digitizer relative to the image; and third means for enabling the beam splitter to be nutated about the image axis and rotated about a beam splitter axis to variably position and orient the beam splitter relative to the image; wherein:

said second and third means are operative to align the work station by causing the reflected image to appear, to the eye of the user, to be substantially coincident with the drawing being made by the user on the digitizer.

2. The work station of claim 1, further comprising:

means for vertically positioning the digitizer relative to the user without mis-aligning the drawing and the reflected image.

3. The work station of claim 1, wherein the position and orientation of the digitizer and the imaging device relative to one another define a mouth having a front and a back opening, and wherein said second means is operable by the user to choose a size of one of the front and back openings substantially independently of the size chosen for the other opening.

4. The work station of claim 1, wherein the position and orientation of the digitizer and the imaging device relative to one another define a mouth having a front and a back, and wherein said second means is operable by the user to increase the size of the front of the mouth without having to decrease the size of the rear of the mouth.

5. The work station of claim 1 wherein said beam splitter has a partially reflective first surface, and a second surface treated to reduce reflections of light incident on the surface.

6. The work station of claim 5, wherein said anti-reflective treatment comprises an anti-reflective coating applied to said second surface.

7. The work station of claim 5, wherein said partially reflective first surface comprises a coating of silvering material applied to said first surface.

8. The work station of claim 1, wherein said beam splitter includes a partially reflective surface.

9. The work station of claim 1, wherein said beam splitter includes a surface treated to be anti-reflective.

10. The work station of claim 1, wherein said imaging device comprises a flat CRT.

11. The work station of claim 1, wherein said imaging device comprises a color-sequential CRT.

12. The work station of claim 8, wherein said partially reflective surface comprises a layer of metal.

13. The work station of claim 8, wherein said partially reflective surface comprises a layer of dielectric material.

14. The work station of claim 8, wherein said partially reflective surface comprises at least one layer of a holographic reflector.

15. The work station of claim 8, wherein said partially reflective surface comprises a plurality of layers of a holographic reflector material, each layer tuned to reflect light in a different band of wavelengths to cause light in those bands to be primarily reflected and light in other bands to be primarily transmitted.

16. The work station of claim 15, wherein said reflective surface comprises three layers of holographic reflector material, each layer tuned to reflect light in a different one of three primary color bands.

17. The work station of claim 1, wherein said imaging device comprises a curved CRT, and wherein said work station further comprises:

means for compensating for the curvature of the CRT to cause the image reflected off of the beam splitter to appear substantially coincident with the drawing being made on the digitizer.

18. The work station of claim 17, wherein said compensating means comprises a field flattener interposed between the CRT and the beam splitter.

19. The work station of claim 18, wherein the field flattener includes a lens shaped to compensate for image curvature induced by the curvature of the CRT.

20. The work station of claim 18, wherein the field flattener comprises a pancake window.

21. The work station of claim 20, wherein the pancake window comprises:

a polarizer to cause the image produced by the CRT to be circularly polarized;

a partially reflective mirror shaped to compensate for curvature in the reflected image caused by the curvature of the CRT, said mirror being situated to allow the circularly polarized image to be transmitted through it; and a cholesteric reflector situated to reflect the circularly polarized image transmitted through the mirror back to the mirror, and to transmit the image reflected off of the mirror to the beam splitter.

22. The work station of claim 21, wherein the image produced by the CRT is smaller than a desired image size, and the pancake mirror also magnifies the image to the desired size.

23. The work station of claim 18, wherein the image produced by the CRT is smaller than a desired image size, and wherein said field flattener also magnifies the image to the desired size.

24. The work station of claim 23, wherein said field flattener/image magnifier comprises a partially reflective concave mirror.

25. The work station of claim 23, wherein said field flattener/image magnifier comprises a pancake window.

26. The work station of claim 25, wherein said pancake window comprises:
- a polarizer to cause the image produced by the CRT to be circularly polarized;
- a partially reflective mirror shaped to compensate for curvature in the reflected image caused by the curvature of the CRT, said mirror being situated to allow the circularly polarized image to be transmitted through it; and
- a cholesteric reflector situated to reflect the circularly polarized image transmitted through the mirror back to the mirror, and to transmit the image reflected off of the mirror to the beam splitter.

27. The work station of claim 1 wherein the digitizer has an active digitizing surface area, wherein the image reflected to the user is smaller than the active digitizing surface area to define an external digitizing surface beyond the periphery of the image, such that said external digitizing surface is adapted for enabling the user to send commands to a computer to control tools for drawing the image.

28. The work station of claim 1, wherein:
- said first means includes an axle extending along at least a portion of the image axis;
- said second means includes a first linkage pivotally coupled at one end to the axle, and a support member for said digitizer pivotally coupled to the other end of said first linkage; and
- said third means includes a second linkage pivotally coupled at one end to the axle, and a support member for said beam splitter pivotally coupled to the other end of said second linkage.

29. The work station of claim 1, further comprising:
- fourth means for adjusting at least one of the digitizer and image relative to the other about an axis orthogonal to the surface of the digitizer, said fourth means being operative in conjunction with said second and third means to align the work station by causing the reflected image to appear substantially coincident with the drawing being made by the user.

30. The work station of claim 1, wherein said imaging device comprises a pi cell shuttered color sequential CRT.

31. The work station of claim 1, wherein said imaging device comprises a liquid crystal or an active matrix display.

32. The work station of claim 1, wherein said work station is aligned by causing the reflected image to appear closely above the surface of the digitizer to accommodate the thickness of a sheet of paper on which the drawing is made.

33. The work station of claim 1, wherein said imaging device includes an image projector and a display surface, and the produced image appears on the display surface.

34. A computer graphic work station adapted for including a digitizer, an imaging device for producing an image of a drawing being drawn by a user on the digitizer, and a beam splitter for at least partially reflecting the image produced by the imaging device to the eye of the user, the work station comprising:
- first means for enabling the image produced by the imaging device to be placed in a desired vertical position, and to be pivoted about a first axis;
- second means for enabling the digitizer to be rotated about the first axis and rotated about a digitizer axis to variably position and orient the digitizer relative to the image; and
- third means for enabling the beam splitter to be nutated about the first axis and rotated about a beam splitter axis to variably position and orient the beam splitter relative to the image; wherein
- said second and third means are operative to align the work station by causing the reflected image to appear, to the eye of the user, to be substantially coincident with the drawing being made by the user on the digitizer; and
- said first means is operative to adjust the position and orientation of the digitizer relative to the user without causing the drawing and reflected image to become mis-aligned.

35. The work station of claim 34, wherein the position and orientation of the digitizer and the produced image relative to one another define a mouth having a front and a back opening, and wherein said second means is operable by the user to choose a size of one of the front and back openings substantially independently of the size chosen for the other opening.

36. The work station of claim 34, wherein the position and orientation of the digitizer and produced image relative to one another define a mouth having a front and a back, and wherein said second means is operable by the user to increase the size of the front of the mouth without having to decrease the size of the rear of the mouth.

37. The work station of claim 34 wherein said beam splitter has a partially reflective first surface, and a second surface treated to reduce reflections of light incident on the surface.

38. The work station of claim 37, wherein said anti-reflective treatment comprises an anti-reflective coating applied to said second surface.

39. The work station of claim 37, wherein said partially reflective first surface comprises a coating of silvering material applied to said first surface.

40. The work station of claim 34, wherein said beam splitter includes a partially reflective surface.

41. The work station of claim 34, wherein said beam splitter includes a surface treated to be anti-reflective.

42. The work station of claim 34, wherein said imaging device comprises a flat CRT.

43. The work station of claim 34, wherein said imaging device comprises a color-sequential CRT.

44. The work station of claim 40, wherein said partially reflective surface comprises a layer of metal.

45. The work station of claim 40, wherein said partially reflective surface comprises a layer of dielectric material.

46. The work station of claim 40, wherein said partially reflective surface comprises at least one layer of a holographic reflector.

47. The work station of claim 40, wherein said partially reflective surface comprises a plurality of layers of a holographic reflector material, each layer tuned to reflect light in a different band of wavelengths to cause light in those bands to be primarily reflected and light in other bands to be primarily transmitted.

48. The work station of claim 47, wherein said reflective surface comprises three layers of holographic reflector material, each layer tuned to reflect light in a different one of three primary color bands.

49. The work station of claim 34, wherein said imaging device comprises a curved CRT, and wherein said work station further comprises:
- means for compensating for the curvature of the CRT to cause the image reflected off of the beam splitter to appear substantially coincident with the drawing being made on the digitizer.

50. The work station of claim 49, wherein said compensating means comprises a field flattener interposed between the CRT and the beam splitter.

51. The work station of claim 50, wherein the field flattener includes a lens shaped to compensate for image curvature induced by the curvature of the CRT.

52. The work station of claim 50, wherein the field flattener comprises a pancake window.

53. The work station of claim 52, wherein the pancake window comprises:

a polarizer to cause the image produced by the CRT to be circularly polarized;

a partially reflective mirror shaped to compensate for curvature in the reflected image caused by the curvature of the CRT, said mirror being situated to allow the circularly polarized image to be transmitted through it; and a cholesteric reflector situated to reflect the circularly polarized image transmitted through the mirror back to the mirror, and to transmit the image reflected off of the mirror to the beam splitter.

54. The work station of claim 53, wherein the image produced by the CRT is smaller than a desired image size, and the pancake mirror also magnifies the image to the desired size.

55. The work station of claim 50, wherein the image produced by the CRT is smaller than a desired image size, and wherein said field flattener also magnifies the image to the desired size.

56. The work station of claim 55, wherein said field flattener/image magnifier comprises a partially reflective concave mirror.

57. The work station of claim 55, wherein said field flattener/image magnifier comprises a pancake window.

58. The work station of claim 57, wherein said pancake window comprises:

a polarizer to cause the image produced by the CRT to be circularly polarized;

a partially reflective mirror shaped to compensate for curvature in the reflected image caused by the curvature of the CRT, said mirror being situated to allow the circularly polarized image to be transmitted through it; and a cholesteric reflector situated to reflect the circularly polarized image transmitted through the mirror back to the mirror, and to transmit the image reflected off of the mirror to the beam splitter.

59. The work station of claim 34 wherein the digitizer has an active digitizing surface area, wherein the image reflected to the user is smaller than the active digitizing surface area to define an external digitizing surface beyond the periphery of the image, such that said external digitizing surface is adapted for enabling the user to send commands to a computer to control tools for drawing the image.

60. The work station of claim 34, wherein:

said first means includes an axle extending along at least a portion of the image axis;

said second means includes a first linkage pivotally coupled at one end to the axle, and a support member for said digitizer pivotally coupled to the other end of said first linkage; and said third means includes a second linkage pivotally coupled at one end to the axle, and a support member for said beam splitter pivotally coupled to the other end of said second linkage.

61. The work station of claim 34, further comprising:

fourth means for adjusting at least one of the digitizer and image relative to the other about an axis orthogonal to the surface of the digitizer, said fourth means being operative in conjunction with said second and third means to align the work station by causing the reflected image to appear substantially coincident with the drawing being made by the user.

62. The work station of claim 34, wherein said imaging device comprises a pi cell shuttered color sequential CRT.

63. The work station of claim 34, wherein said imaging device comprises a liquid crystal or an active matrix display.

64. The work station of claim 34, wherein said work station is aligned by causing the reflected image to appear closely above the surface of the digitizer to accommodate the thickness of a sheet of paper on which the drawing is made.

65. The work station of claim 34, wherein said imaging device includes an image projector and a display surface, and the produced image appears on the display surface.

66. A computer graphic work station adapted for including a digitizer, an imaging device for producing an image of a drawing being drawn by a user on the digitizer, and a beam splitter for at least partially reflecting the image produced by the imaging device to the eye of the user, the work station comprising:

first means for enabling the image produced by the imaging device to be vertically positioned, and to be pivoted about a first axis;

second means for enabling the digitizer to be variably positioned and oriented relative to the image; and third means for enabling the beam splitter to be variably positioned and oriented relative to the image; wherein said second and third means are operative to align the work station by causing the reflected image to appear, to the eye of the user, to be substantially coincident with the drawing being made by the user on the digitizer; and said first means is operative to adjust the position and orientation of the digitizer relative to the user without causing mis-alignment of the drawing and the image.

67. The work station of claim 66, wherein the position and orientation of the digitizer and the produced image relative to one another define a mouth having a front and a back opening, and wherein said second means is operable by the user to choose a size of one of the front and back openings substantially independently of the size chosen for the other opening.

68. The work station of claim 66, wherein the position and orientation of the digitizer and the produced image relative to one another define a mouth having a front and a back, and wherein said second means is operable by the user to increase the size of the front of the mouth without having to decrease the size of the rear of the mouth.

69. The work station of claim 66 wherein said beam splitter has a partially reflective first surface, and a second surface treated to reduce reflections of light incident on the surface.

70. The work station of claim 69, wherein said anti-reflective treatment comprises an anti-reflective coating applied to said second surface.

71. The work station of claim 69, wherein said partially reflective first surface comprises a coating of silvering material applied to said first surface.

72. The work station of claim 66, wherein said beam splitter includes a partially reflective surface.

73. The work station of claim 66, wherein said beam splitter includes a surface treated to be anti-reflective.

74. The work station of claim 66, wherein said imaging device comprises a flat CRT.

75. The work station of claim 66, wherein said imaging device comprises a color-sequential CRT.

76. The work station of claim 72, wherein said partially reflective surface comprises a layer of metal.

77. The work station of claim 72, wherein said partially reflective surface comprises a layer of dielectric material.

78. The work station of claim 72, wherein said partially reflective surface comprises at least one layer of a holographic reflector.

79. The work station of claim 72, wherein said partially reflective surface comprises a plurality of layers of a holographic reflector material, each layer tuned to reflect light in a different band of wavelengths to cause light in those bands to be primarily reflected and light in other bands to be primarily transmitted.

80. The work station of claim 79, wherein said reflective surface comprises three layers of holographic reflector material, each layer tuned to reflect light in a different one of three primary color bands.

81. The work station of claim 66, wherein said imaging device comprises a curved CRT, and wherein said work station further comprises:

means for compensating for the curvature of the CRT to cause the image reflected off of the beam splitter to appear substantially coincident with the drawing being made on the digitizer.

82. The work station of claim 81, wherein said compensating means comprises a field flattener interposed between the CRT and the beam splitter.

83. The work station of claim 82, wherein the field flattener includes a lens shaped to compensate for image curvature induced by the curvature of the CRT.

84. The work station of claim 82, wherein the field flattener comprises a pancake window.

85. The work station of claim 84, wherein the pancake window comprises:

a polarizer to cause the image produced by the CRT to be circularly polarized;

a partially reflective mirror shaped to compensate for curvature in the reflected image caused by the curvature of the CRT, said mirror being situated to allow the circularly polarized image to be transmitted through it; and a cholesteric reflector situated to reflect the circularly polarized image transmitted through the mirror back to the mirror, and to transmit the image reflected off of the mirror to the beam splitter.

86. The work station of claim 85, wherein the image produced by the CRT is smaller than a desired image size, and the pancake mirror also magnifies the image to the desired size.

87. The work station of claim 82, wherein the image produced by the CRT is smaller than a desired image size, and wherein said field flattener also magnifies the image to the desired size.

88. The work station of claim 87, wherein said field flattener/image magnifier comprises a partially reflective concave mirror.

89. The work station of claim 87, wherein said field flattener/image magnifier comprises a pancake window.

90. The work station of claim 89, wherein said pancake window comprises:

a polarizer to cause the image produced by the CRT to be circularly polarized;

a partially reflective mirror shaped to compensate for curvature in the reflected image caused by the curvature of the CRT, said mirror being situated to allow the circularly polarized image to be transmitted through it; and a cholesteric reflector situated to reflect the circularly polarized image transmitted through the mirror back to the mirror, and to transmit the image reflected off of the mirror to the beam splitter.

91. The work station of claim 66 wherein the digitizer has an active digitizing surface area, wherein the image reflected to the user is smaller than the active digitizing surface area to define an external digitizing surface beyond the periphery of the image, such that said external digitizing surface is adapted for enabling the user to send commands to a computer to control tools for drawing the image.

92. The work station of claim 66, wherein:

said first means includes an axle extending along at least a portion of the image axis;

said second means includes a first linkage pivotally coupled at one end to the axle, and a support member for said digitizer pivotally coupled to the other end of said first linkage; and said third means includes a second linkage pivotally coupled at one end to the axle, and a support member for said beam splitter pivotally coupled to the other end of said second linkage.

93. The work station of claim 66, further comprising:

fourth means for adjusting at least one of the digitizer and image relative to the other about an axis orthogonal to the surface of the digitizer, said fourth means being operative in conjunction with said second and third means to align the work station by causing the reflected image to appear substantially coincident with the drawing being made by the user.

94. The work station of claim 66, wherein said imaging device comprises a pi cell shuttered color sequential CRT.

95. The work station of claim 66, wherein said imaging device comprises a liquid crystal or an active matrix display.

96. The work station of claim 66, wherein said work station is aligned by causing the reflected image to appear closely above the surface of the digitizer to accommodate the thickness of a sheet of paper on which the drawing is made.

97. The work station of claim 66, wherein said imaging device includes an image projector and a display surface, and the produced image appears on the display surface.

98. A computer graphic work station adapted for including a digitizer, an imaging device for producing an image of a drawing being drawn by a user on the digitizer, and a beam splitter disposed for reflecting at least a portion of the image produced by the imaging device to the eye of the user, the improved work station comprising:

first means for enabling the image produced by the imaging device to be pivoted about a first axis;

second means for enabling the digitizer to be variably positioned and oriented relative to the image; and third means for enabling the beam splitter to be variably positioned and oriented relative to the image; wherein said second and third means are operative to align the work station by causing the reflected image to appear, to the eye of the user, to be substantially coincident with the drawing being made by the user on the digitizer.

99. The work station of claim 98, further comprising:

means for vertically positioning the digitizer relative to the user without causing the drawing and reflected to become mis-aligned.

100. The work station of claim 98, wherein the position and orientation of the digitizer and produced image relative to one another define a mouth having a front and a back opening, and wherein said second means is operable by the user to choose a size of one of the front and back openings substantially independently of the size chosen for the other opening.

101. The work station of claim 98, wherein the position and orientation of the digitizer and produced image relative to one another define a mouth having a front and a back, and wherein said second means is operable by the user to increase the size of the front of the mouth without having to decrease the size of the rear of the mouth.

102. The work station of claim 98 wherein said beam splitter has a partially reflective first surface, and a second surface treated to reduce reflections of light incident on the surface.

103. The work station of claim 102, wherein said antireflective treatment comprises an anti-reflective coating applied to said second surface.

104. The work station of claim 102, wherein said partially reflective first surface comprises a coating of silvering material applied to said first surface.

105. The work station of claim 98, wherein said beam splitter includes a partially reflective surface.

106. The work station of claim 98, wherein said beam splitter includes a surface treated to be anti-reflective.

107. The work station of claim 98, wherein said imaging device comprises a flat CRT.

108. The work station of claim 98, wherein said imaging device comprises a color-sequential CRT.

109. The work station of claim 105, wherein said partially reflective surface comprises a layer of metal.

110. The work station of claim 105, wherein said partially reflective surface comprises a layer of dielectric material.

111. The work station of claim 105, wherein said partially reflective surface comprises at least one layer of a holographic reflector.

112. The work station of claim 105, wherein said partially reflective surface comprises a plurality of layers of a holographic reflector material, each layer tuned to reflect light in a different band of wavelengths to cause light in those bands to be primarily reflected and light in other bands to be primarily transmitted.

113. The work station of claim 112, wherein said reflective surface comprises three layers of holographic reflector material, each layer tuned to reflect light in a different one of three primary color bands.

114. The work station of claim 98, wherein said imaging device comprises a curved CRT, and wherein said work station further comprises:
means for compensating for the curvature of the CRT to cause the image reflected off of the beam splitter to appear substantially coincident with the drawing being made on the digitizer.

115. The work station of claim 114, wherein said compensating means comprises a field flattener interposed between the CRT and the beam splitter.

116. The work station of claim 115, wherein the field flattener includes a lens shaped to compensate for image curvature induced by the curvature of the CRT.

117. The work station of claim 115, wherein the field flattener comprises a pancake window.

118. The work station of claim 117, wherein the pancake window comprises:
a polarizer to cause the image produced by the CRT to be circularly polarized;
a partially reflective mirror shaped to compensate for curvature in the reflected image caused by the curvature of the CRT, said mirror being situated to allow the circularly polarized image to be transmitted through it; and
a cholesteric reflector situated to reflect the circularly polarized image transmitted through the mirror back to the mirror, and to transmit the image reflected off of the mirror to the beam splitter.

119. The work station of claim 118, wherein the image produced by the CRT is smaller than a desired image size, and the pancake mirror also magnifies the image to the desired size.

120. The work station of claim 115, wherein the image produced by the CRT is smaller than a desired image size, and wherein said field flattener also magnifies the image to the desired size.

121. The work station of claim 120, wherein said field flattener/image magnifier comprises a partially reflective concave mirror.

122. The work station of claim 120, wherein said field flattener/image magnifier comprises a pancake window.

123. The work station of claim 122, wherein said pancake window comprises:
a polarizer to cause the image produced by the CRT to be circularly polarized;
a partially reflective mirror shaped to compensate for curvature in the reflected image caused by the curvature of the CRT, said mirror being situated to allow the circularly polarized image to be transmitted through it; and
a cholesteric reflector situated to reflect the circularly polarized image transmitted through the mirror back to the mirror, and to transmit the image reflected off of the mirror to the beam splitter.

124. The work station of claim 98 wherein the digitizer has an active digitizing surface area, wherein the image reflected to the user is smaller than the active digitizing surface area to define an external digitizing surface beyond the periphery of the image, such that said external digitizing surface is adapted for enabling the user to send commands to a computer to control tools for drawing the image.

125. The work station of claim 98, wherein:
said first means includes an axle extending along at least a portion of the image axis;
said second means includes a first linkage pivotally coupled at one end to the axle, and a support member for said digitizer pivotally coupled to the other end of said first linkage; and
said third means includes a second linkage pivotally coupled at one end to the axle, and a support member for said beam splitter pivotally coupled to the other end of said second linkage.

126. The work station of claim 98, further comprising:
fourth means for adjusting at least one of the digitizer and image relative to the other about an axis orthogonal to the surface of the digitizer, said fourth means being operative in conjunction with said second and third means to align the work station by causing the reflected image to appear substantially coincident with the drawing being made by the user.

127. The work station of claim 98, wherein said imaging device comprises a pi cell shuttered color sequential CRT.

128. The work station of claim 98, wherein said imaging device comprises a liquid crystal or an active matrix display.

129. The work station of claim 98, wherein said work station is aligned by causing the reflected image to appear closely above the surface of the digitizer to accommodate the thickness of a sheet of paper on which the drawing is made.

130. The work station of claim 98, wherein said imaging device includes an image projector and a display surface, and the produced image appears on the display surface.

131. A computer graphic work station adapted for including a digitizer, an imaging device for producing an image of a drawing being drawn by a user on the digitizer, and a beam splitter for at least partially reflecting the image produced by the imaging device to the eye of the user, the work station comprising:

first means for enabling the digitizer to be variably positioned and oriented relative to the image; and second means for enabling the beam splitter to be variably positioned and oriented relative to the image; wherein said first and second means are operative to align the work station by causing the reflected image to appear, to the eye of the user, to be substantially coincident with the drawing.

132. The work station of claim 131, further comprising:
means for positioning and orienting the digitizer relative to the user without mis-aligning the work station.

133. The work station of claim 131, wherein the position and orientation of the digitizer and produced image relative to one another define a mouth having a front and a back opening, and wherein said second means is operable by the user to choose a size of one of the front and back openings substantially independently of the size chosen for the other opening.

134. The work station of claim 131, wherein the position and orientation of the digitizer and produced image relative to one another define a mouth having a front and a back, and wherein said second means is operable by the user to increase the size of the front of the mouth without having to decrease the size of the rear of the mouth.

135. The work station of claim 131, wherein the position and orientation of the digitizer and produced image relative to one another define a mouth having a front and a back, and wherein said second means is operable by the user to increase the of the front of the mouth while simultaneously decreasing the size of the rear of the mouth.

136. The work station of claim 131 wherein said beam splitter has a partially reflective first surface, and a second surface treated to reduce reflections of light incident on the surface.

137. The work station of claim 135, wherein said anti-reflective treatment comprises an anti-reflective coating applied to said second surface.

138. The work station of claim 135, wherein said partially reflective first surface comprises a coating of silvering material applied to said first surface.

139. The work station of claim 131, wherein said beam splitter includes a partially reflective surface.

140. The work station of claim 131, wherein said beam splitter includes a surface treated to be anti-reflective.

141. The work station of claim 131, wherein said imaging device comprises a flat CRT.

142. The work station of claim 131, wherein said imaging device comprises a color-sequential CRT.

143. The work station of claim 139, wherein said partially reflective surface comprises a layer of metal.

144. The work station of claim 139, wherein said partially reflective surface comprises a layer of dielectric material.

145. The work station of claim 139, wherein said partially reflective surface comprises at least one layer of a holographic reflector.

146. The work station of claim 139, wherein said partially reflective surface comprises a plurality of layers of a holographic reflector material, each layer tuned to reflect light in a different band of wavelengths to cause light in those bands to be primarily reflected and light in other bands to be primarily transmitted.

147. The work station of claim 146, wherein said reflective surface comprises three layers of holographic reflector material, each layer tuned to reflect light in a different one of three primary color bands.

148. The work station of claim 131, wherein said imaging device comprises a curved CRT, and wherein said work station further comprises:

means for compensating for the curvature of the CRT to cause the image reflected off of the beam splitter to appear substantially coincident with the drawing being made on the digitizer.

149. The work station of claim 148, wherein said compensating means comprises a field flattener interposed between the CRT and the beam splitter.

150. The work station of claim 149, wherein the field flattener includes a lens shaped to compensate for image curvature induced by the curvature of the CRT.

151. The work station of claim 149, wherein the field flattener comprises a pancake window.

152. The work station of claim 151, wherein the pancake window comprises:

a polarizer to cause the image produced by the CRT to be circularly polarized;

a partially reflective mirror shaped to compensate for curvature in the reflected image caused by the curvature of the CRT, said mirror being situated to allow the circularly polarized image to be transmitted through it; and a cholesteric reflector situated to reflect the circularly polarized image transmitted through the mirror back to the mirror, and to transmit the image reflected off of the mirror to the beam splitter.

153. The work station of claim 152, wherein the image produced by the CRT is smaller than a desired image size, and the pancake mirror also magnifies the image to the desired size.

154. The work station of claim 149, wherein the image produced by the CRT is smaller than a desired image size, and wherein said field flattener also magnifies the image to the desired size.

155. The work station of claim 154, wherein said field flattener/image magnifier comprises a partially reflective concave mirror.

156. The work station of claim 154, wherein said field flattener/image magnifier comprises a pancake window.

157. The work station of claim 156, wherein said pancake window comprises:

a polarizer to cause the image produced by the CRT to be circularly polarized;

a partially reflective mirror shaped to compensate for curvature in the reflected image caused by the curvature of the CRT, said mirror being situated to allow the circularly polarized image to be transmitted through it; and a cholesteric reflector situated to reflect the circularly polarized image transmitted through the mirror back to the mirror, and to transmit the image reflected off of the mirror to the beam splitter.

158. The work station of claim 131 wherein the digitizer has an active digitizing surface area, wherein the image reflected to the user is smaller than the active digitizing surface area to define an external digitizing surface beyond the periphery of the image, such that said external digitizing surface is adapted for enabling the user to send commands to a computer to control tools for drawing the image.

159. The work station of claim 131, wherein:
said first means includes an axle extending along at least a portion of the image axis;
said second means includes a first linkage pivotally coupled at one end to the axle, and a support member for said digitizer pivotally coupled to the other end of said first linkage; and
said third means includes a second linkage pivotally coupled at one end to the axle, and a support member for said beam splitter pivotally coupled to the other end of said second linkage.

160. The work station of claim 131, further comprising:
fourth means for adjusting at least one of the digitizer and image relative to the other about an axis orthogonal to the surface of the digitizer, said fourth means being operative in conjunction with said second and third means to align the work station by causing the reflected image to appear substantially coincident with the drawing being made by the user.

161. The work station of claim 131, wherein said imaging device comprises a pi cell shuttered color sequential CRT.

162. The work station of claim 131, wherein said imaging device comprises a liquid crystal or an active matrix display.

163. The work station of claim 131, wherein said work station is aligned by causing the reflected image to appear closely above the surface of the digitizer to accommodate the thickness of a sheet of paper on which the drawing is made.

164. The work station of claim 131, wherein said imaging device includes an image projector and a display surface, and the produced image appears on the display surface.

165. A method for aligning a computer graphic work station adapted for including a digitizer, an imaging device for producing an image of a drawing being made by a user on the digitizer, and a beam splitter for at least partially reflecting the image produced by the imaging device to the eye of the user, said aligning method comprising the steps of:
varying the position and orientation of the beam splitter relative to the produced image to cause the reflected image to be seen by the user; and
varying the position and orientation of the digitizer relative to the produced image to cause the reflected image to appear to the user to be substantially coincident with the drawing.

166. The method of claim 165, further including the step of:
adjusting the digitizer to be in a desired vertical position and angular orientation relative to the user, said adjusting step being performed without causing the computer graphic work station to become mis-aligned.

167. The method of claim 165, wherein the position and orientation of the digitizer and produced image relative to one another define a mouth having a front and a back opening, and wherein said method further comprises the step of:
varying the size of one of the front and back openings substantially independently of the size of the other.

168. The method of claim 165, wherein the position and orientation of the digitizer and produced image relative to one another define a mouth having a front and a back opening, and wherein said method further comprises the step of:
increasing the size of the one of the front and rear openings without having to decrease the size of the other opening.

169. The method of claim 165, wherein said imaging device comprises a curved CRT, and wherein said method further comprises the step of:
compensating for the curvature of the CRT to cause the image reflected off of the beam splitter to appear substantially coincident with the drawing being made on the digitizer.

170. The method of claim 169, wherein said compensating step includes the steps of:
circularly polarizing the image produced by the CRT;
transmitting the circularly polarized image through a partially reflective mirror shaped to compensate for curvature in induced in the reflected image by the curvature of the CRT;
reflecting the circularly polarized light transmitted through the mirror off of a cholesteric reflector back to the mirror's shaped surface; and
transmitting the light reflected off of the mirror through the cholesteric reflector to the beam splitter.

171. The method of claim 169, wherein the image produced by the CRT is smaller than a desired image size, said method further comprising the step of:
magnifying the image to the desired size.

172. The method of claim 165, wherein the imaging device is flat, and wherein the image produced by the imaging device is smaller than a desired image, the method further comprising the step of:
magnifying the produced image to the desired size.

173. The method of claim 165, further comprising the step of:
adjusting at least one of the digitizer and image relative to the other about an axis orthogonal to the surface of the digitizer, to align the work station by causing the reflected image to appear substantially coincident with the drawing being made by the user.

174. A method for aligning a computer graphic work station adapted for including a digitizer, an imaging device for producing an image of a drawing being made by a user on the digitizer, and a beam splitter for at least partially reflecting the image produced by the imaging device to the eye of the user, said aligning method comprising the steps of:
varying the orientation of the beam splitter relative to the image produced by the imaging device to cause the image reflected by the beam splitter to be seen by the user; and
varying the orientation of the digitizer relative to the image produced by the imaging device to cause the image reflected by the beam splitter to appear to the user to be substantially coincident with the drawing being made on the digitizer; and
varying at least on of the position and orientation of the digitizer relative to the user without mis-aligning the work station.

* * * * *